US010785324B2

(12) United States Patent
Zheng et al.

(10) Patent No.: US 10,785,324 B2
(45) Date of Patent: Sep. 22, 2020

(54) METHOD FOR MANAGING PICTURE FILE AND TERMINAL, COMPUTER STORAGE MEDIUM

(71) Applicant: Tencent Technology (Shenzhen) Company Limited, Shenzhen (CN)

(72) Inventors: Yuyu Zheng, Shenzhen (CN); Weinan Zhang, Shenzhen (CN)

(73) Assignee: TENCENT TECHNOLOGY (SHENZHEN) COMPANY LIMITED, Shenzhen, Guangdong Province (CN)

(*) Notice: Subject to any disclaimer, the term of this patent is extended or adjusted under 35 U.S.C. 154(b) by 0 days.

(21) Appl. No.: 16/543,354

(22) Filed: Aug. 16, 2019

(65) Prior Publication Data
US 2019/0373067 A1 Dec. 5, 2019

Related U.S. Application Data

(63) Continuation of application No. PCT/CN2017/099179, filed on Aug. 25, 2017.

(51) Int. Cl.
H04L 29/08 (2006.01)
G06K 9/62 (2006.01)
(Continued)

(52) U.S. Cl.
CPC ........... H04L 67/18 (2013.01); G06K 9/6215 (2013.01); H04L 29/08 (2013.01); H04L 51/32 (2013.01);
(Continued)

(58) Field of Classification Search
CPC .. G06K 9/6215; G06K 9/00268; H04L 29/08; H04L 51/32; H04L 67/12; H04L 67/18;
(Continued)

(56) References Cited

U.S. PATENT DOCUMENTS

2009/0140887 A1* 6/2009 Breed ................ G08G 1/0112
340/990
2013/0218721 A1* 8/2013 Borhan .............. G06Q 30/02
705/26.41
(Continued)

FOREIGN PATENT DOCUMENTS

CN 102651748 A 8/2012
CN 102750332 A 10/2012
(Continued)

OTHER PUBLICATIONS

Tencent Technology, WO, PCT/CN2017/099179, May 24, 2018, 3 pgs.

(Continued)

Primary Examiner — Le H Luu
(74) Attorney, Agent, or Firm — Morgan, Lewis & Bockius LLP

(57) ABSTRACT

This application discloses a picture file management method performed at a computing device, and an associated non-transitory computer storage medium. The method includes: obtaining a picture set; extracting, from the picture set, a picture meeting a policy and parsing the picture, to obtain geographical location information related to the picture; obtaining a real-time target location of a terminal according to the geographical location information related to the picture; tagging the real-time target location onto a map page, to generate a location tag for the picture; classifying at least one picture conforming to the real-time target location, to obtain a picture classification result; and obtaining a to-be-released picture according to the picture classification result and the location tag.

20 Claims, 16 Drawing Sheets

(51) Int. Cl.
*H04L 12/58* (2006.01)
*H04W 4/021* (2018.01)
*H04L 29/06* (2006.01)

(52) U.S. Cl.
CPC .............. *H04L 67/12* (2013.01); *H04W 4/021* (2013.01); *H04L 69/16* (2013.01)

(58) Field of Classification Search
CPC ........ H04L 69/16; H04W 4/021; H04W 4/21; G06F 3/04842; G06Q 30/02; G08G 1/0112; H04N 7/155
See application file for complete search history.

(56) References Cited

U.S. PATENT DOCUMENTS

| | | | | |
|---|---|---|---|---|
| 2014/0165010 | A1* | 6/2014 | Yoshikawa | G06F 3/04842 715/840 |
| 2016/0109954 | A1* | 4/2016 | Harris | G06K 9/00268 345/156 |
| 2016/0232571 | A1* | 8/2016 | Moshfeghi | H04W 4/21 |
| 2017/0280099 | A1* | 9/2017 | John | H04N 7/155 |

FOREIGN PATENT DOCUMENTS

| | | |
|---|---|---|
| CN | 102929956 A | 2/2013 |
| CN | 104253740 A | 12/2014 |
| CN | 105592155 A | 5/2016 |
| EP | 1863267 A1 | 12/2007 |
| EP | 1863267 A1 | 12/2017 |

OTHER PUBLICATIONS

Tencent Technology, IPRP, PCT/CN2017/099179, Feb. 25, 2020, 4 pgs.

Tencent Technology, ISR, PCT/CN2017/099179, May 24, 2018, 2 pgs.

* cited by examiner

A new travel destination/new travel photo is detected

Seoul-Korea

We have selected 36 photos of Seoul for you

Add to may map

Add to personal travel map

Nara   Nara
 338 Likes   338 Likes

View excellent photos taken by other users during travel

M ira luo
Seoul Interior designer
338 Likes

Suze Shen
Zhenjiang
Product manager
338 Likes

METHOD FOR MANAGING PICTURE FILE AND TERMINAL, COMPUTER STORAGE MEDIUM

CROSS-REFERENCE TO RELATED APPLICATIONS

This application is a continuation application of PCT/CN2017/099179, entitled "PICTURE FILE MANAGEMENT METHOD AND TERMINAL, AND COMPUTER STORAGE MEDIUM" filed on Aug. 25, 2017, which is incorporated by reference in its entirety.

FIELD OF THE TECHNOLOGY

This application relates to the field of information releasing technologies, and in particular, to a picture file management method and terminal, and a computer storage medium.

BACKGROUND OF THE DISCLOSURE

In current social networking platforms, geographical location information may be selected when picture information is released. However, geographical locations that can be added are all locations where users are located when releasing information. On one hand, a user needs to add geographical location information manually. On the other hand, the added geographical location information is not necessarily consistent with a location where the picture is taken. With regard to a real-time requirement of social networking platform information sharing, if a picture cannot be released in time, interactive feedback of picture information cannot be implemented in time. In the related technology, there is no effective solution to this problem.

SUMMARY

In view of this, embodiments of this application provide a picture file management method and terminal, and a computer storage medium, to at least resolve the problems in the existing technology.

A picture file management method according to an embodiment of this application includes:

obtaining a picture set;
extracting, from the picture set, a picture meeting a policy and parsing the picture, to obtain geographical location information related to the picture;
obtaining a real-time target location of a terminal according to the geographical location information related to the picture;
tagging the real-time target location onto a map page, to obtain a location tag for the picture;
classifying at least one picture conforming to the real-time target location, to obtain a picture classification result; and
obtaining a to-be-released picture according to the picture classification result and the location tag.

A computing device according to an embodiment of the present application comprises one or more processors, memory coupled to the one or more processors and a plurality of programs stored in the memory that, when executed by the one or more processors, cause the computing device to perform the aforementioned picture file management method.

A non-transitory computer readable storage medium according to an embodiment of the present application stores a plurality of machine readable instructions in connection with a computing device having one or more processors. The plurality of machine readable instructions, when executed by the one or more processors, cause the computing device to perform the aforementioned picture file management method.

The picture file management method according to the embodiment of this application includes: obtaining pictures on a terminal side, to obtain a picture set; extracting, from the picture set, a picture meeting a policy and parsing the picture, to obtain geographical location information related to the picture; obtaining a real-time target location of a terminal according to the geographical location information related to the picture; tagging the real-time target location onto a map page, to obtain a location tag; classifying at least one picture conforming to the real-time target location, to obtain a picture classification result; and obtaining a to-be-released picture according to the picture classification result and the location tag.

By using the embodiments of this application, pictures on a terminal side are obtained and a picture meeting a policy is extracted; the picture is parsed to obtain geographical location information related to the picture, and a real-time target location of a terminal is obtained according to the geographical location information related to the picture. Therefore, it is unnecessary to manually select and add a geographical location, and the geographical location obtained through picture acquisition and automatic detection can reflect a real-time geographical location of the picture taken, and conforms to the location where the picture is taken, thereby meeting a real-time requirement of information sharing based on a social networking platform. The real-time target location is tagged on a constructed map page, to obtain a location tag. After at least one picture conforming to the real-time target location is classified, the picture is released according to the location tag. This is real-time picture information releasing. Because a picture can be released in real time at a real-time geographical location based on classification, the picture is released more accurately and in time. Therefore, users can perform interactive feedback for the picture information in time, thereby improving interactivity of information sharing.

DESCRIPTION OF EMBODIMENTS

Figure 1:
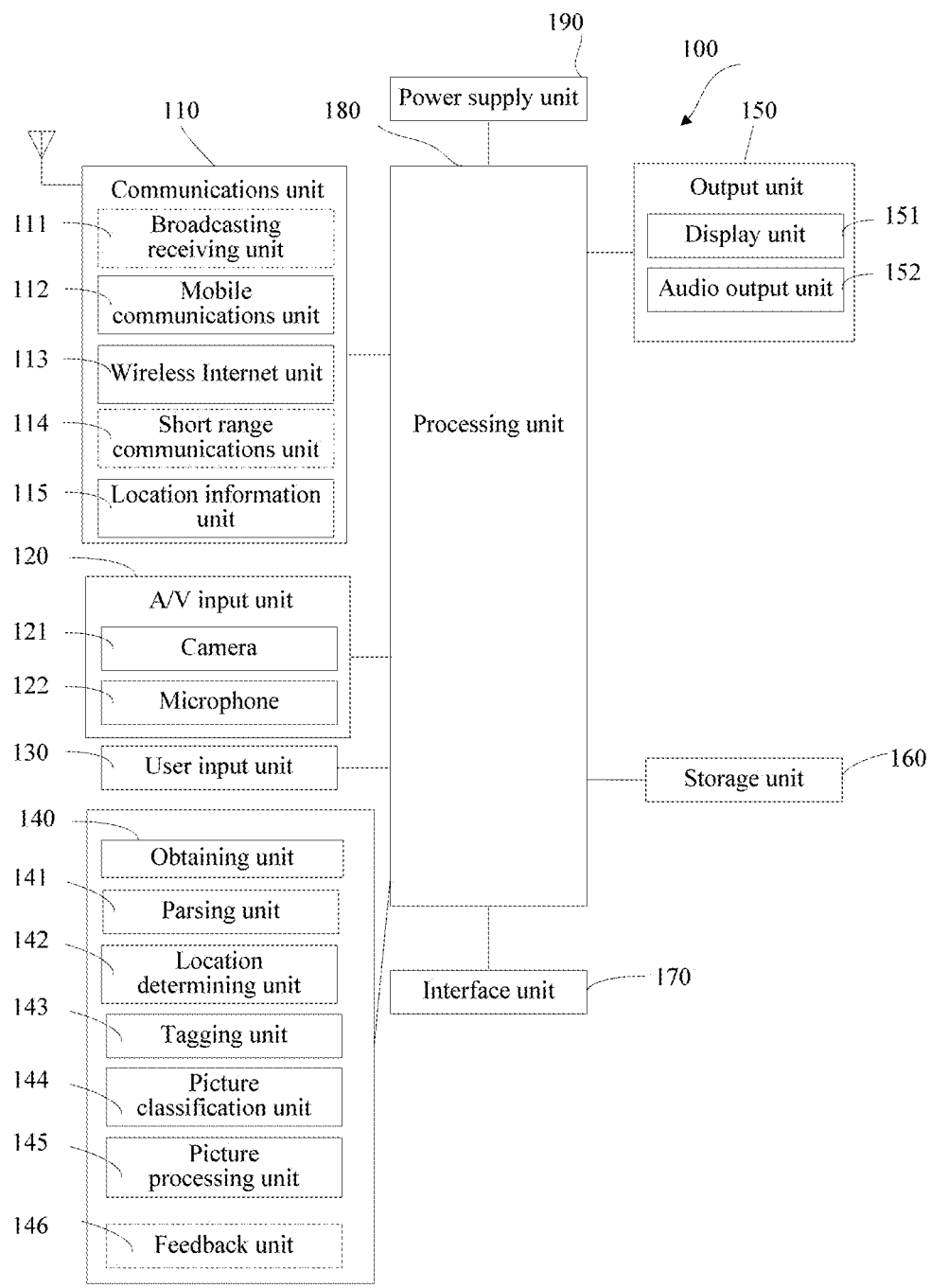
FIG. 1 is a schematic diagram of an optional hardware structure of a mobile terminal for implementing embodiments of this application.

Implementation of the technical solution is described in further detail below with reference to the accompanying drawings.

A mobile terminal implementing the embodiments of this application is described with reference to the accompanying drawings. In the subsequent description, suffixes such as "module", "component" or "unit" for representing elements are merely used for facilitating the description of the embodiments of this application, and have no specific meaning. Therefore, the "module" and "component" can be used in mixture.

In the following detailed description, numerous details are stated, so that this application can be understood thoroughly. However, for a person of ordinary skill in the art, obviously, this application can be practiced without these specific details. In other cases, well-known methods, processes, components, circuits, and networks disclosed are not described in detail, to avoid unnecessarily obscuring various aspects of the embodiments.

In addition, although terms such as "first" and "second" are used many times in this specification to describe various elements (or various thresholds, various applications, various instructions, or various operations), the elements (or thresholds, applications, instructions, or operations) should not be limited by the terms. The terms are merely used for distinguishing one element (or threshold, application, instruction, or operation) from another element (or threshold, application, instruction, or operation). For example, a first operation may be referred to as a second operation, and a second operation may also be referred to as a first operation without departing from the scope of this application. The first operation and the second operation are both operations, except that the two are different operations.

Steps in the embodiments of this application are not necessarily processed according to the described step sequence. Steps may be selectively re-ordered according to a requirement, or steps in the embodiments may be deleted, or steps may be added to the embodiments. The step description in the embodiments of this application is merely an optional sequence combination, and does not represent all step sequence combinations of the embodiments of this application. The step sequence in the embodiments cannot be considered as a limitation on this application.

The term "and/or" in the embodiments of this application refers to any or all possible combinations including one or more of associated items listed. It should be further noted that, when used in this specification, "and/or" indicates the presence of the stated feature, integer, step, operation, element and/or component, but does not exclude the presence or addition of one or more other features, integers, steps, operations, elements and/or components, and/or a group thereof.

An intelligent terminal (such as a mobile terminal) in the embodiments of this application may be implemented in various forms. For example, the mobile terminal described in the embodiments of this application may include mobile terminals such as a mobile phone, a smartphone, a notebook computer, a digital broadcasting receiver, a personal digital assistant (PDA), a tablet computer (PAD), a portable media player (PMP), and a navigation apparatus, and fixed terminals such as a digital TV, and a desktop computer. In the following, it is assumed that the terminal is a mobile terminal. However, it will be appreciated by a person skilled in the art that, the structure according to the implementation of this application can also be applied to a fixed-type terminal in addition to elements particularly for a mobile purpose.

FIG. 1 is a schematic diagram of an optional hardware structure of a mobile terminal for implementing embodiments of this application.

A mobile terminal 100 may include a communications unit 110, an audio/video (A/V) input unit 120, a user input unit 130, an obtaining unit 140, a parsing unit 141, a location determining unit 142, a tagging unit 143, a picture classification unit 144, a picture processing unit 145, a feedback unit 146 (the feedback unit is optional, but is not mandatory), an output unit 150, a storage unit 160, an interface unit 170, a processing unit 180, a power supply unit 190, and the like. FIG. 1 shows a mobile terminal having various components. However, it should be noted that, not all components shown are required to be implemented. Alternatively, more or fewer components may be implemented. Elements of the mobile terminal are described in detail below.

The communications unit 110 usually includes one or more components, and allows radio communication between the mobile terminal 100 and a wireless communications system or network (if the mobile terminal is replaced with a fixed terminal, telecommunication may be performed in a wired manner). For example, when the communications unit is specifically a wireless communications unit, the communications unit may include at least one of a broadcasting receiving unit 111, a mobile communications unit 112, a wireless Internet unit 113, a short range communications unit 114, and a location information unit 115. These units are optional, and may be added or deleted according to different requirements.

The broadcasting receiving unit 111 receives a broadcasting signal and/or broadcasting-related information from an external broadcasting management server through a broadcasting channel. The broadcasting channel may include a satellite channel and/or a terrestrial channel. The broadcasting management server may be a server that generates and sends a broadcasting signal and/or broadcasting-related information, or a server that receives a previously generated broadcasting signal and/or broadcasting-related information and sends the broadcasting signal and/or broadcasting-related information to a terminal. The broadcasting signal may include a TV broadcasting signal, a radio broadcasting signal, a data broadcasting signal, and the like. Moreover, the broadcasting signal may further include a broadcasting signal combined with a TV or radio broadcasting signal. The broadcasting-related information may also be provided by a mobile communications network, and in this case, the broadcasting-related information may be received by the mobile communications unit 112. The broadcasting signal may exist in various forms, for example, in a form of a digital multimedia broadcasting (DMB) electronic program guide (EPG), a digital video broadcasting-handheld (DVB-H) electronic service guide (ESG), or the like. The broadcasting receiving unit 111 may receive signal broadcasting through various types of broadcasting systems. Particularly, the broadcasting receiving unit 111 may receive digital broadcasting by using a digital multimedia broadcasting-terrestrial (DMB-T), digital multimedia broadcasting-satellite (DMB-S) or media forward link only (MediaFLO) data broadcasting system, an integrated services digital broadcasting-terrestrial (ISDB-T) digital broadcasting system, and the like. The broadcasting receiving unit 111 may be constructed as various broadcasting systems suitable for providing broadcasting signals and the foregoing digital broadcasting system. The broadcasting signal and/or broadcasting-related information received through the broadcasting receiving unit 111 may be stored in a memory 160 (or other types of storage media).

The mobile communications unit 112 sends a radio signal to at least one of a base station (for example, an access point, or a NodeB), an external terminal, and a server, and/or receive a radio signal from at least one of the base station, the external terminal, and the server. Such a radio signal may include a voice call signal, a video call signal, or various types of data sent and/or received according to a text and/or multimedia message.

The wireless Internet unit 113 supports wireless Internet access of the mobile terminal. The unit may be coupled to the terminal internally or externally. A wireless Internet access technology related to the unit may include wireless local area networks (Wi-Fi or WLAN), wireless broadband (Wibro), Worldwide Interoperability for Microwave Access (Wimax), high speed downlink packet access (HSDPA), and the like.

The short range communications unit 114 is a unit for supporting short range communication. Some examples of the short range communication technology include Bluetooth, radio frequency identification (RFID), Infrared Data Association (IrDA), ultra wideband (UWB), Zigbee, and the like.

The location information unit 115 is a unit for checking or obtaining location information of the mobile terminal. A typical example of the location information unit is a Global Positioning System (GPS). According to the current technology, the location information unit 115 calculates distance information and accurate time information from three or more satellites, and applies trilateration to the calculated information, so as to accurately calculate three-dimensional current location information according to the longitude, latitude and attitude. Currently, in a method for calculating location and time information, three satellites are used, and another satellite is used to correct errors in the calculated location and time information. In addition, the location information unit 115 can calculate speed information by continuously calculating current location information in real time.

The A/V input unit 120 is configured to receive an audio signal or a video signal. The A/V input unit 120 may include a camera 121 and a microphone 122. The camera 121 processes a static picture or image data in a video obtained by an image capture apparatus in a video capture mode or an image capture mode. A processed image frame may be displayed on a display unit 151. The image frame processed by the camera 121 may be stored in the storage unit 160 (or other storage media) or sent through the communications unit 110. Two or more cameras 121 may be provided according to the structure of the mobile terminal. The microphone 122 may receive sound (audio data) through a microphone in an operation mode such as a call mode, a recording mode, or a speech recognition mode, and can process such sound to obtain audio data. Processed audio (voice) data may be converted, in a telephone call mode, into an output in a form that can be sent to a mobile communications base station through the mobile communications unit 112. The microphone 122 may implement various types of noise elimination (or suppression) algorithms to eliminate (or suppress) noise or interference generated in a process of receiving and sending an audio signal.

The user input unit 130 may generate key input data according to a command input by a user, to control various operations of the mobile terminal. The user input unit 130 allows the user to input various types of information, and may include a keyboard, a mouse, a touch pad (such as a touch sensitive component that detects changes in resistance, pressure, capacitance, and the like caused by touch), a scroll wheel, a joystick, and the like. Particularly, when the touch pad is stacked on the display unit 151 in a form of a layer, a touchscreen can be formed.

The obtaining unit 140 is configured to obtain pictures from a terminal side (where pictures are acquired from at least one data source and stored on the terminal side), to obtain a picture set. The parsing unit 141 is configured to extract, from the picture set, a picture meeting a policy (for example, meeting a current time policy), and parse the picture, to obtain geographical location information related to the picture. The location determining unit 142 is configured to obtain a real-time target location of the terminal according to the geographical location information related to the picture. The tagging unit 143 is configured to tag the real-time target location onto a constructed map page, to obtain a location tag. The picture classification unit 144 is configured to classify at least one picture conforming to the real-time target location, to obtain a picture classification result. The picture processing unit 145 is configured to obtain a to-be-released picture according to the picture classification result and the location tag, so as to release the to-be-released picture according to the location tag. As an optional unit in the terminal, the feedback unit 146 is not mandatory, and is configured to trigger interactive feedback for the released picture according to a first operation.

The interface unit 170 is used as an interface through which at least one external apparatus and the mobile terminal 100 can be connected. For example, the external apparatus may include a wired or wireless headset port, an external power supply (or battery charger) port, a wired or wireless data port, a memory card port, a port for connection to an apparatus having an identification unit, an audio input/output (I/O) port, a video I/O port, an earphone port, and the like. The identification unit may be configured to store various information for verifying a user using the mobile terminal 100, and may include a user identity module (UIM), a subscriber identity module (SIM), a universal subscriber identity module (USIM), and the like. In addition, the apparatus having the identification unit (which is referred to as an "identification apparatus" hereinafter) may be in a form of a smart card. Therefore, the identification apparatus may be connected to the mobile terminal 100 through a port or another connection apparatus. The interface unit 170 may be configured to receive an input (such as data information, and power) from an external apparatus, and transmit the received input to one or more elements in the mobile terminal 100, or may be configured to transmit data between the mobile terminal and an external apparatus.

In addition, when the mobile terminal 100 is connected to an external base, the interface unit 170 may be used as a path through which power is allowed to be supplied from the base to the mobile terminal 100 or used as a path through which various command signals input from the base are allowed to be transmitted to the mobile terminal. Various command signals or power input from the base may be used as signals for identifying whether the mobile terminal is correctly mounted on the base. The output unit 150 is configured to provide an output signal (such as an audio signal, a video signal, or a vibration signal) in a visual, audio and/or touch manner. The output unit 150 may include a display unit 151, an audio output unit 152, or the like.

The display unit 151 may display information processed in the mobile terminal 100. For example, the mobile terminal 100 may display a related user interface (UI) or a graphical user interface (GUI). When the mobile terminal 100 is in a video call mode or an image capture mode, the display unit 151 may display a captured image and/or a received image, and display a UI or GUI of a video or an image and related functions, and the like.

Moreover, when the display unit 151 and the touch pad are stacked together as layers to form a touchscreen, the display unit 151 may be used as an input apparatus and an output apparatus. The display unit 151 may include at least one of a liquid crystal display (LCD), a thin film transistor-LCD (TFT-LCD), an organic light-emitting diode (OLED) display, a flexible display, a three-dimensional (3D) display, and the like. Some of these displays may be constructed to be transparent to allow users to view the displays from the external, and such displays may be referred to as transparent displays. A typical transparent display may be, for example, a transparent OLED (TOLED) display, and the like. According to a specific desired implementation, the mobile terminal 100 may include two or more display units (or other display apparatuses). For example, the mobile terminal may include an external display unit (not shown) and an internal display unit (not shown). The touchscreen may be configured to detect a touch input pressure, a touch input position, and a touch input area.

The audio output unit 152 may convert audio data received by the communications unit 110 or stored in the memory 160 into an audio signal and output the audio signal as voice when the mobile terminal is in a calling signal receiving mode, a call mode, a recording mode, a speech recognition mode, a broadcasting receiving mode, and the like. Moreover, the audio output unit 152 may provide an audio output (for example, a calling signal receiving sound, or a message receiving sound) related to a particular function performed by the mobile terminal 100. The audio output unit 152 may include a loudspeaker, a buzzer, and the like.

The storage unit 160 may store software programs of processing and control operations performed by the processing unit 180, and the like, or may temporarily store output data or to-be-output data (for example, a personal address book, a message, a static image, or a video). Moreover, the storage unit 160 may store data about vibrations and audio signals in various manners which are output when a touch is applied to the touchscreen.

The storage unit 160 may include at least one type storage medium. The storage medium includes a flash memory, a hard disk, a multimedia card, a card-type memory (for example, an SD memory or a DX memory), a random access memory (RAM), a static random access memory (SRAM), a read-only memory (ROM), an electrically erasable programmable read-only memory (EEPROM), a programmable read-only memory (PROM), a magnetic memory, a magnetic disk, an optical disc, and the like. Moreover, the mobile terminal 100 may coordinate, through a network connection, with a network storage apparatus performing a storage function of the storage unit 160.

The processing unit 180 usually controls overall operations of the mobile terminal. For example, the processing unit 180 performs control and processing related to a voice call, data communication, a video call, and the like. For another example, the processing unit 180 may perform mode recognition processing, so as to recognize a handwrite input or a picture drawing input performed on the touchscreen as a character or an image.

The power supply unit 190 receives external power or internal power under the control of the processing unit 180 and provides power required for operating various elements and components.

Various implementations described herein may be implemented by using a computer readable medium such as computer software, hardware, or any combination thereof. For hardware implementation, the implementations described herein may be implemented by using at least one of an application specific integrated circuit (ASIC), digital signal processing (DSP), a digital signal processing device (DSPD), a programmable logic device (PLD), a field programmable gate array (FPGA), a processor, a controller, a microcontroller, a microprocessor, and an electronic unit designed to perform the functions described herein. In some cases, such implementations may be implemented in the processing unit 180. For the software implementation, an implementation of a process, a function, or the like may be implemented together with a separate software unit allowed to perform at least one function or operation. Software code may be implemented by a software application (or program) written with any suitable programming language. The software code may be stored in the storage unit 160 and executed by the processing unit 180. A specific hardware entity of the storage unit 160 may be a memory, and a specific hardware entity of the processing unit 180 may be a controller.

So far, the mobile terminal has been described according to the functions thereof. In the following, for the purpose of conciseness, among various types of mobile terminals such as foldable-type, bar-type, swing-type, and slide-type mobile terminals, a slide-type mobile terminal is used as an example for description. Therefore, this application can be applied to any type of mobile terminal, and is not limited to the slide-type mobile terminal.

The mobile terminal 100 shown in FIG. 1 may be configured to be operated by using a wired or wireless communications system that sends data through frames or packets, and a satellite-based communications system.

Figure 2:
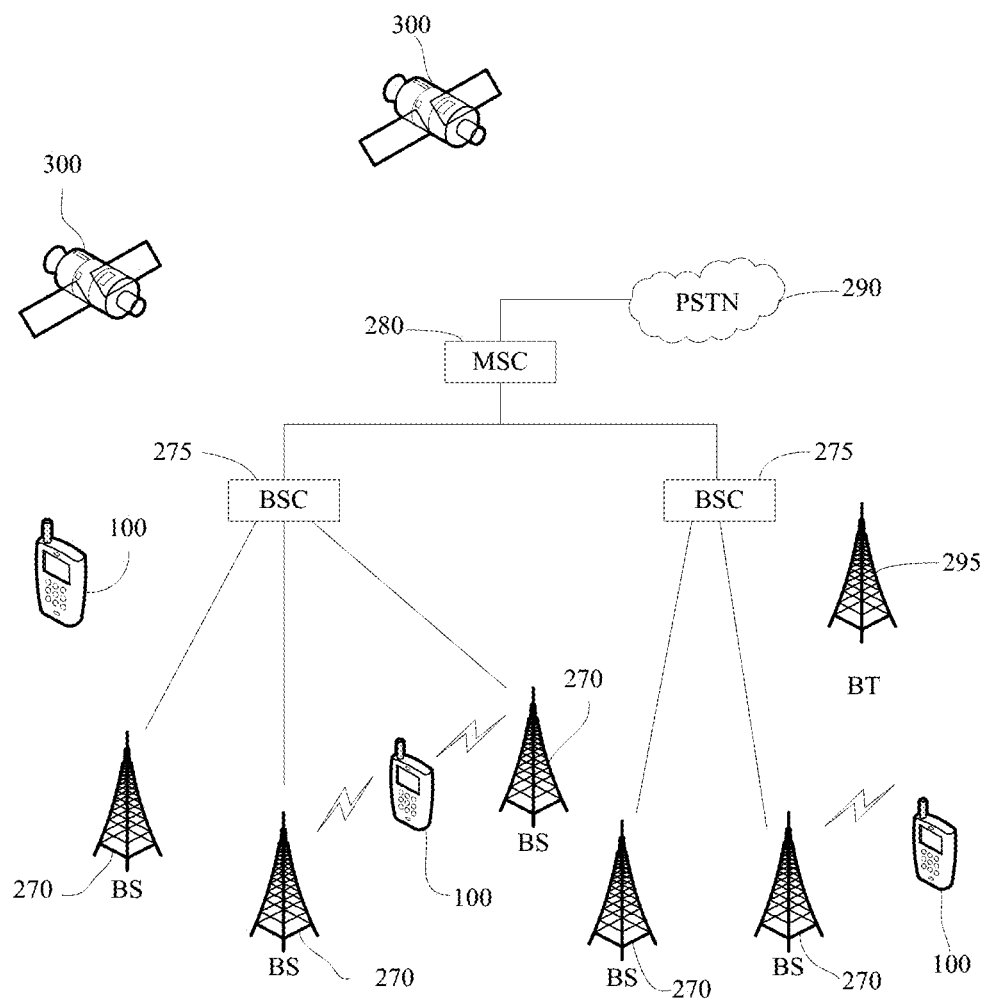
FIG. 2 is a schematic diagram of a communications system of the mobile terminal shown in FIG. 1.

A communications system that can be operated by the mobile terminal according to embodiment of this application is described now with reference to FIG. 2.

Such a communications system can use different air interfaces and/or physical layers. For example, air interfaces used by the communications system include Frequency Division Multiple Access (FDMA), Time Division Multiple Access (TDMA), Code Division Multiple Access (CDMA), a Universal Mobile Telecommunications System (UMTS) (particularly, Long Term Evolution (LTE)), a Global System for Mobile Communications (GSM), and the like. As a non-restrictive example, the following description relates to the CDMA communications system, but such a teaching is also applicable to systems of other types.

Referring to FIG. 2, the CDMA wireless communications system may include multiple mobile terminals 100, multiple base stations (BSs) 270, a base station controller (BSC) 275, and a mobile switching center (MSC) 280. The MSC 280 is configured to form an interface with a public switched telephone network (PSTN) 290. The MSC 280 is further configured to form an interface with the BSC 275 that can be coupled to the BSs 270 through a backhaul circuit. The backhaul circuit may be configured according to any one of several known interfaces. The interface includes, for example, E1/T1, an ATM, an IP, a PPP, a frame relay, an HDSL, an ADSL, or an xDSL. It will be appreciated that, the system shown in FIG. 2 may include multiple BSCs 275.

Each BS 270 may serve one or more zones (or areas), and each zone covered by an omni-directional antenna or an antenna pointing to a specific direction is away from the BS 270 in a radial pattern. Alternatively, each zone may be covered by two or more antennas for diversity reception. Each BS 270 may be configured to support multiple frequency allocations, and each frequency allocation has a specific spectrum (for example, 1.25 MHz or 5 MHz).

A crossover between a zone and a frequency allocation may be referred to as a CDMA channel. The BS 270 may also be referred to as a base transceiver station (BTS) or other equivalent terms. In this case, the term "base station" may be used to generally represent a single BSC 275 and at least one BS 270. The base station may also be referred to as a "cellular station". Alternatively, zones of a specific BS 270 may be referred to as cellular stations.

As shown in FIG. 2, a broadcast transmitter (BT) 295 transmits a broadcasting signal to the mobile terminal 100 operating in the system. The broadcasting receiving unit 111 shown in FIG. 1 is disposed in the mobile terminal 100 to receive the broadcasting signal sent by the BT 295. In FIG. 2, several satellites 300 are shown. For example, a Global Positioning System (GPS) satellite 300 may be used. The satellites 300 help position at least one of multiple mobile terminals 100.

In FIG. 2, multiple satellites 300 are drawn. However, it should be understood that, any quantity of satellites may be used to obtain useful positioning information. The location information unit 115 shown in FIG. 1 is usually configured to coordinate with the satellites 300 to obtain desired positioning information. In replacement of GPS tracking technology or in addition to the GPS tracking technology, other technologies that can track a location of the mobile terminal may be used. In addition, at least one GPS satellite 300 may selectively or additionally process satellite DMB transmission.

As a typical operation of the wireless communications system, the BS 270 receives reverse link signals from various mobile terminals 100. The mobile terminal 100 usually participates in calls, message sending and receiving, and other types of communication. Each reverse link signal received by a specific base station is processed in the specific BS 270. Obtained data is forwarded to a related BSC 275. The BSC provides call resource allocation and a mobile management function that includes coordination of a soft handover process between BSs 270. The BSC 275 further routes the received data to the MSC 280, and provides an additional routing service of forming an interface with the PSTN 290. Similarly, the PSTN 290 forms an interface with the MSC 280, the MSC forms an interface with the BSC 275, and the BSC 275 correspondingly controls the BS 270, so as to send a forward link signal to the mobile terminal 100.

The mobile communications unit 112 of the communications unit 110 in the mobile terminal accesses a mobile telecommunications network based on necessary data (including user identification information and authentication information) of the built-in access mobile communications network (such as a 2G/3G/4G mobile communications network) of the mobile terminal, to transmit mobile communication data (including uplink mobile communication data and downlink mobile communication data) for services, such as webpage browsing and network multimedia playing, of a user of the mobile terminal.

The wireless Internet unit 113 of the communications unit 110 implements a function of a mobile hotspot by running a related protocol function of the mobile hotspot. The mobile hotspot supports access of multiple mobile terminals (any mobile terminals except said mobile terminal), and transmits mobile communication data (including uplink mobile communication data and downlink mobile communication data) for services, such as webpage browsing and network multimedia playing, of the user of the mobile terminal by multiplexing a mobile communications connection between the mobile communications unit 112 and the mobile telecommunications network. Because the mobile terminal actually multiplexes the mobile communications connection between the mobile terminal and the communications network to transmit the mobile communication data, traffic of the mobile communication data consumed by the mobile terminal is counted into a telecom expense of the mobile terminal by a charging entity on a communications network side, thereby consuming data traffic of mobile communication data included in the telecom expense of the mobile terminal for subscription.

Figure 3:
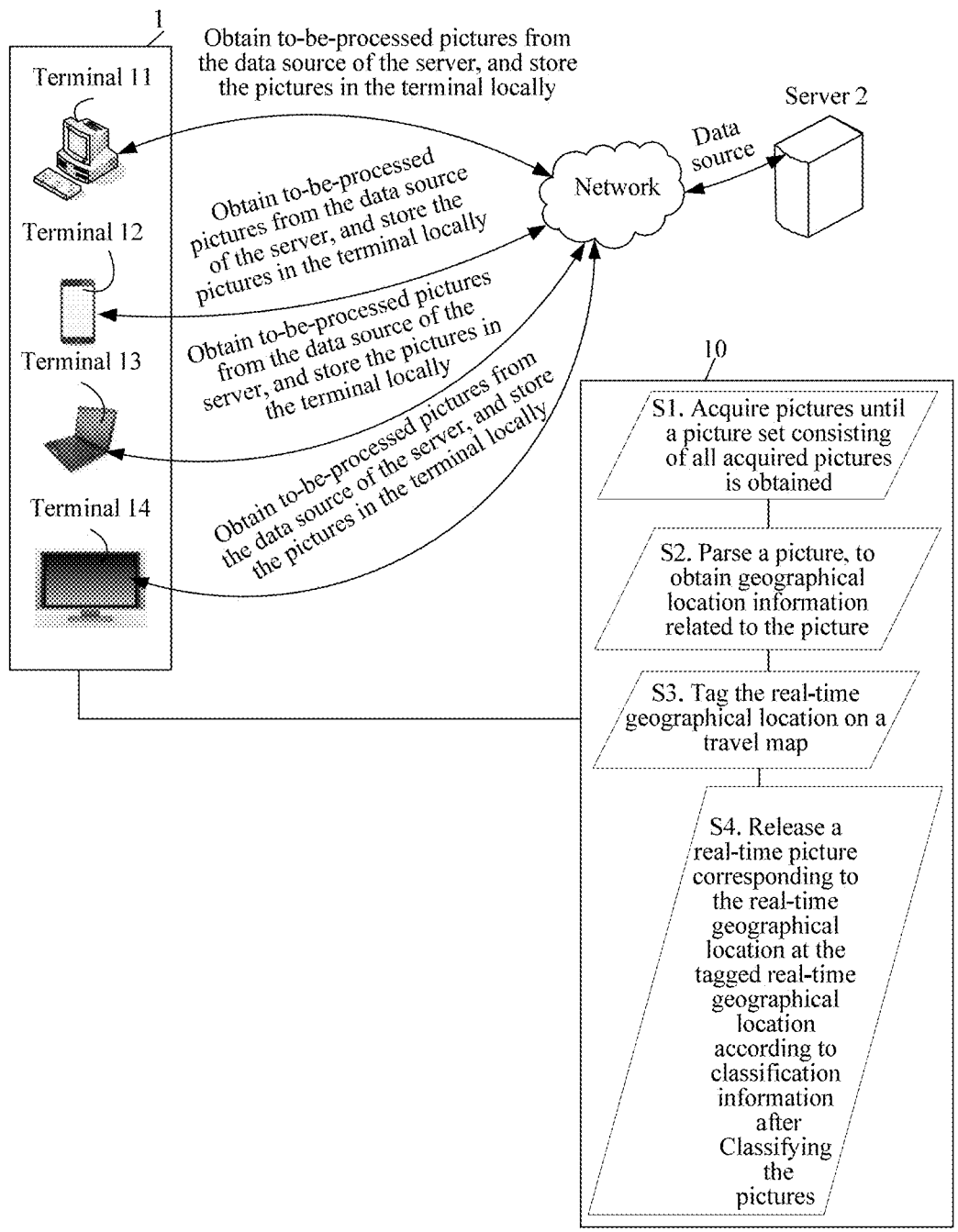
FIG. 3 is a schematic diagram of hardware entities participating in information interaction according to an embodiment of this application.

FIG. 3 is a schematic diagram of hardware entities participating in information interaction according to an embodiment of this application. FIG. 3 includes: a terminal device 1 and a server 2. The terminal device 1 includes terminal devices 11 to 14. The terminal device performs information interaction with the server through a wired network or a wireless network. The terminal device includes a mobile phone, a desktop computer, a PC, an all-in-one machine, and other types of devices. By using the embodiment of this application, in an interaction process between the terminal and the server, in a scenario where processing logic is performed on the terminal side and the server is used as a part of a data source, pictures may be acquired from the terminal side, until a picture set consisting of all pictures from the terminal side is obtained. There is at least one data source, which may include a data source obtained from a self-owned application according to this application (for example, Tencent album keeper) or obtained from a third-party application (Tiantian PT, Baidu Motu, Meitu, or the like), or a built-in program of the terminal (for example, a camera application of an IPHONE). Then, a picture extracted from the picture set is parsed. For example, geographical location information related to the picture is obtained according to an exchangeable image file (EXIF) of the picture, for example, a picture being taken currently or a picture taken on the current day, so as to obtain a real-time target location of the terminal according to the geographical location information related to the picture. Finally, at the real-time target location, the picture is released according to classification information of the picture. Processing logic 10 on the terminal side is shown in FIG. 3, and includes: S1, acquiring pictures until a picture set consisting of all acquired pictures is obtained; S2, parsing a picture, to obtain geographical location information related to the picture; S3, tagging the real-time geographical location on a travel map; S4, releasing a real-time picture corresponding to the real-time geographical location at the tagged real-time geographical location according to classification information after classifying the pictures.

The example in FIG. 3 is merely one system architecture example for implementing the embodiment of this application. The embodiment of this application is not limited to the system structure shown in FIG. 3. Based on the system architecture shown in FIG. 3, embodiments of the method of this application are provided.

In the embodiment of this application, in the processing logic 10, other processing logic except acquisition processing on the terminal side may be implemented on a server side, for example, coordinate transformation from longitude and latitude information to geographical location information, and classification. When the processing logic 10 is executed by the terminal, a picture database stored in the server may be used as a data source of the terminal.

Figure 7:
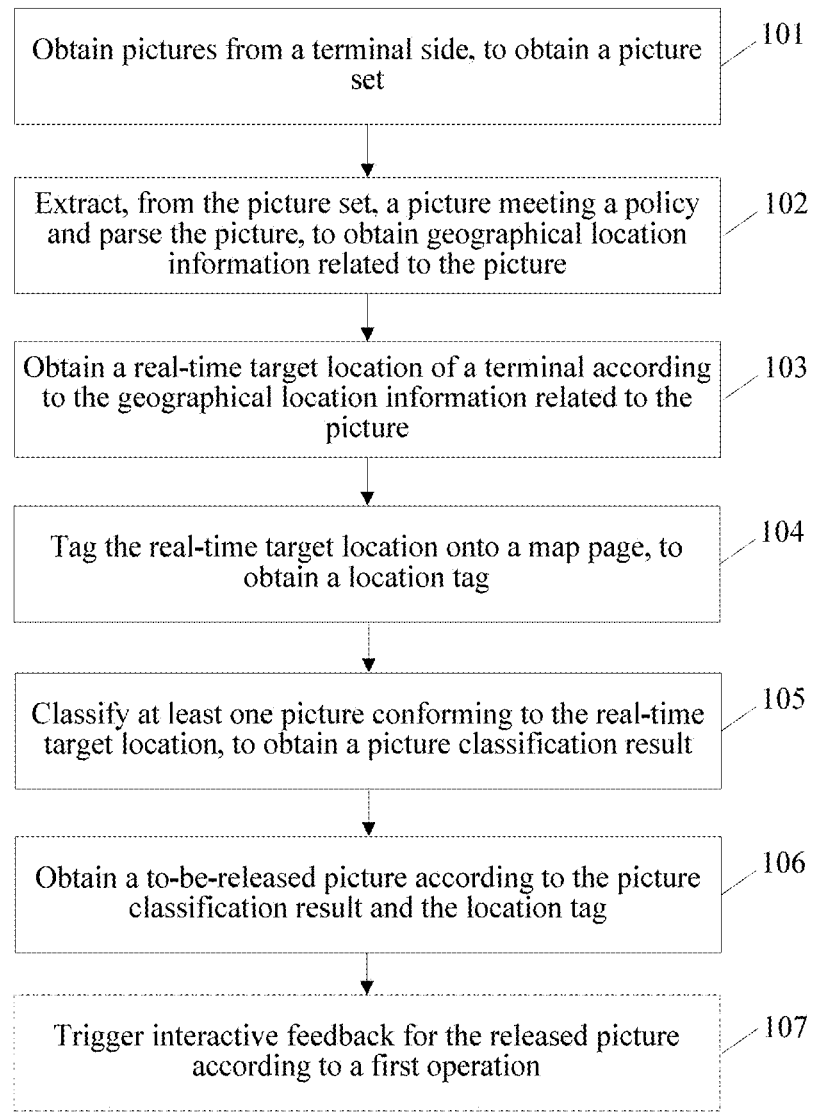
FIG. 7 is a schematic flowchart of implementation of a method according to an embodiment of this application.

As shown in FIG. 7, the picture file management method according to the embodiment of this application includes: obtaining a picture set from a terminal side (101). Pictures are acquired from at least one data source and are stored on the terminal side. The picture set may be a set consisting of all pictures or some of pictures from the terminal side. For example, to obtain all pictures meeting a time policy and preset the pictures on a map page according to time and geographical locations, pictures on the terminal side may be traversed in the foregoing obtaining operation, until a picture set consisting of all pictures on the terminal side is obtained. The data source includes a data source obtained from a self-owned application according to this application (for example, Tencent album keeper) or obtained from a third-party application (Tiantian PT, Baidu Motu, Meitu, or the like), or a built-in program of the terminal (for example, a camera application of an IPHONE). All these applications can achieve light sensitivity, white balance, exposure, a shutter speed, and an aperture value of one or more pictures, and a function of splicing multiple pictures into a new picture. On one hand, the data source may be existing pictures obtained in many manners, and are already stored on the terminal side. On the other hand, the data source may also be pictures being taken currently in many manners.

In the embodiment of this application, a photo describes a target object obtained in a dynamic photographing process. After being stored in a terminal or uploaded to the background of a server of a social networking platform through a user account associated with the terminal, the photo can be referred to as a taken photo. Photos obtained in dynamic photographing processes and taken photos may be stored in a memory or a memory card of the terminal or stored in the background of the server in a form of a picture format. A photo is a specific implementation of a picture file in this application.

In the embodiment of this application, a picture meeting a policy (for example, a picture meeting a current time policy) is extracted from the picture set and parsed, to obtain geographical location information related to the picture (102). Specifically, the picture meeting the current time policy may be a picture being taken currently, or a picture taken on the current day. Alternatively, pictures taken by a user during travel period may be found according to an air ticket, a short message, and other information of the user.

In the embodiment of this application, a real-time target location of a terminal is obtained according to the geographical location information related to the picture (103). The real-time target location, such as a location where the picture is taken, may be a travel destination or a place of residence. The place of residence includes: a registered residential place, a non-registered residential place, or the like. In the case of pictures being taken currently in many manners, in this embodiment, the real-time target location of the terminal may be obtained according to the geographical location information related to the picture (which is referred to as first geographical location information). If the geographical location information related to the picture (which is referred to as second geographical location information) is parsed out from existing pictures that are obtained in many manners and stored on the terminal side, the real-time target location of the terminal may also be obtained according to the geographical location information related to the picture (which is referred to as second geographical location information).

In the embodiment of this application, the real-time target location of the terminal may be obtained according to the geographical location information related to the picture. In addition, if the existing picture is not taken just now at the current location but is taken previously at another location, for example, if a travel destination is Indonesia, it can be directly obtained in real time that the geographical location information is "Indonesia" according to a photo taken in Indonesia; when all pictures are acquired and it is obtained that a photo is taken several months ago in Beijing, it can also be directly determined that the geographical location information is "Beijing", and the geographical location is not the current real-time location "Indonesia".

In the embodiment of this application, the real-time target location is tagged on a map page, to obtain a location tag for the picture (104). The map page may be constructed already or may be rendered in real time. At least one picture conforming to the real-time target location is classified to obtain a picture classification result (105). A to-be-released picture is obtained according to the picture classification result and the location tag (106). Then, the to-be-released picture can be released according to the location tag. Specifically, picture classification may include: geographical location-based classification and individualized classification. Finally, interactive feedback for the released picture may further be triggered according to a first operation (107). Step 107 is optional, but is not mandatory. For example, the picture is released on the user account of the social networking platform according to the picture classification result or the location tag or both.

In an application scenario, if a user cannot release a picture at a travel destination in time during travel, the current travel destination cannot be positioned. The user may be too tired during travel to release and share pictures in time. If the user manually adds the geographical location of the current travel destination after returning to the hotel, the geographical location becomes the location of the local hotel, and is no longer the location of the local scenic spot. In other words, the added geographical location information is not necessarily consistent with the location where the picture is taken and is not necessarily in real time. On one hand, the geographical location information can only be added manually. On the other hand, the added geographical location information does not reflect the current location. In social networking platform information sharing, real-time performance is an important technical index.

The location based service (LBS) according to the embodiment of this application can ensure the accuracy of the technical index. The LBS is a value-added service that obtains location information of a mobile terminal user through a radio communications network of a telecom mobile operator or in an external positioning manner, and provides a corresponding service for the user with the support of a geographic information system (GIS) platform. First, information about a geographical location of a mobile device or a user is determined; then, various information services related to the geographical location are provided, for example, various service systems related to positioning, which are referred to as positioning services for short or may be referred to as mobile positioning services because the services are provided for the mobile terminal. For example, after a current geographical location of a mobile phone terminal user is found according to a GIS or a GPS, names and addresses of hotels, movie theatres, libraries, gas stations, and the like within an area of 1 kilometers from the current location of the mobile phone terminal user are searched for within a range of 10 square kilometers in Beijing. In this way, with the assistance of the Internet or a wireless network, two main functions: positioning and serving, can be implemented between a fixed user and a mobile user.

In an example of the embodiment of this application, based on the LBS technology, geographical location information, such as a travel destination/place of residence, of the user may be calculated automatically according to positioning information included in an EXIF in an existing picture of the user. The EXIF includes metadata customized for the picture, to record shooting parameters, a thumbnail and other attribute information of the picture, for example, time information, and geographical location information. By parsing the EXIF, the real-time target location of the terminal can be obtained according to the geographical location information in the metadata. During releasing of the picture, the real-time target location may be displayed, and based on a releasing location of the picture, the user is helped to establish an exclusive travel map with a social attribute. Further, during releasing of the picture, a time point when the photo is taken can be displayed together with the real-time target location in the travel map.

Figure 4:
FIG. 4 is a schematic diagram of picture selection in an application interface according to an embodiment of this application.
Figure 4:
Figure 4:
Figure 4:
Figure 5:
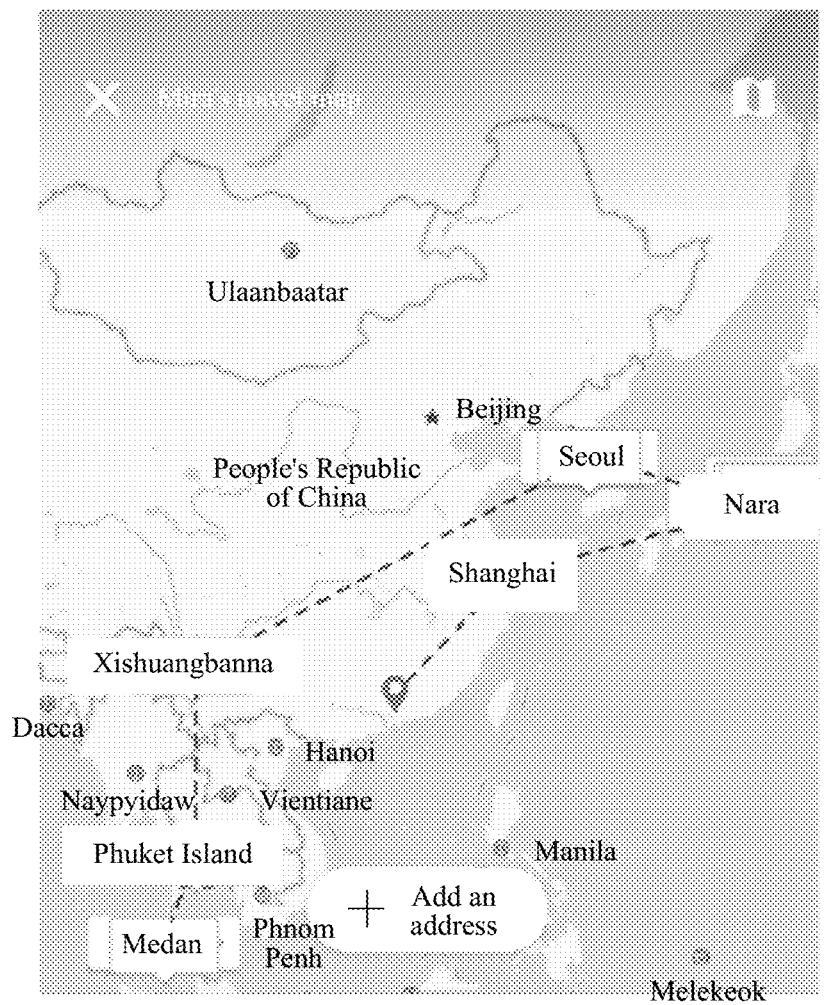
FIG. 5 is a schematic diagram of an interface of a personal travel map of a user according to an embodiment of this application.
Figure 5:
Figure 5:
Figure 5:
Figure 5:
Figure 5:
Figure 5:
Figure 6:
FIG. 6 is a schematic diagram of an interface of a travel map, which can be viewed during interactive feedback between users, of pictures taken by other users during travel according to an embodiment of this application.
Figure 6:
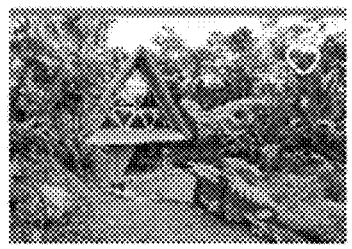
Figure 6:

In the embodiment of this application, an example of the travel map is shown in FIG. 5 to FIG. 6. In the application interface shown in FIG. 4, the current travel destination is Seoul, Korea. According to the foregoing embodiment of picture information releasing, several photos of Seoul are selected for the user according to automatic detection of the real-time geographical location, automatic picture classification, and the like, to prompt the user that these candidate pictures can be added to the travel map. FIG. 5 shows a personal travel map of the user, and the travel map includes multiple location tags, such as existing Medan, Phuket Island, Xishuangbanna, and Nara, and also includes a location tag "Seoul" newly added by the user. FIG. 5 further includes an interaction object "add a location". By touching the interaction object, the user may tag the real-time target location (by parsing the EXIF, the real-time target location of the terminal is obtained according to the geographical location information in the metadata) on a constructed map page, to obtain an added location tag. After at least one target picture conforming to the real-time target location is classified (for example, classified according to a geographical location and classified based on individuality), the picture is released according to the location tag. FIG. 6 shows a travel map of pictures taken by other users during travel, where the travel map can be viewed during interactive feedback between users. The travel map at least includes: user nicknames and location information of pictures taken by users. Definitely, apart from that, the travel map may also include time information of the pictures taken. After pictures taken by other users during travel are seen on the travel map shown in FIG. 6, interactive feedback for the released pictures can be triggered according to a first operation. For example, the user can browse map pictures of other users (friends or strangers), and implement social functions such as giving a like or making a comment.

Different from a solution of displaying nearby landmarks according to the location to allow a user to select and add a landmark, the embodiment of this application is an LBS-based picture interactive feedback solution. A place of residence/travel destination of a user may be calculated automatically according to EXIF positioning information in an existing picture of the user, and based on the location of the picture, the user is helped to establish an exclusive travel map with a social attribute. The user may browse a map photo of a friend or a stranger and then implement a social function such as giving a like or making a comment, thereby meeting requirements such as real-time releasing, analysis, and interactive feedback of picture information. The to-be-released picture may also be released after being classified based on the geographical location of the picture or individuality. Therefore, users having the same interest may be gathered, and a friend circle may be further formed or updated based on the users having the same interest, achieving accurate picture sharing. Subsequently, on one hand, for the formed or updated friend circle, a picture may be only released to the users having the same interest, but is not released to users not interested in the picture. On the other hand, the purpose of releasing a picture to a stranger is to form or update a friend circle. If the stranger has no interactive feedback for the releasing of the picture, it is unnecessary to continue to release the picture, thereby avoiding releasing a large amount of useless information. Moreover, a travel map presentation form of a map is used in releasing of pictures, which is more intuitive, thereby not only providing a photo map browsing function for the user, but also facilitating an interactive feedback operation of the user.

Figure 8:
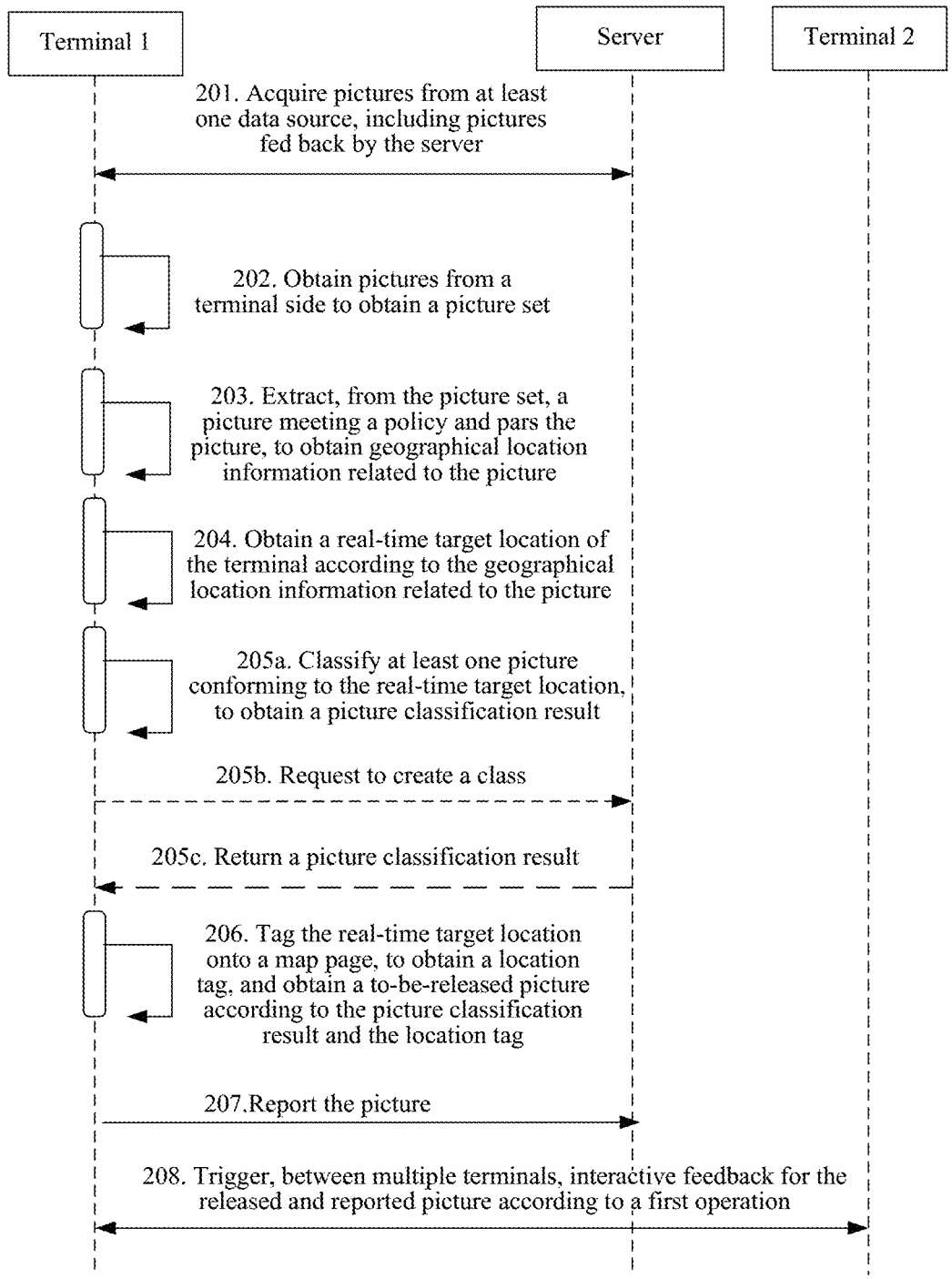
FIG. 8 is a schematic diagram of interaction between multiple terminals and a server according to an embodiment of this application.

Corresponding to the picture file management method according to the embodiment of this application, FIG. 8 is a schematic diagram of interaction between multiple terminals and a server, including: acquiring pictures from at least one data source, including pictures fed back by the server (201). The pictures acquired from the at least one data source are stored on a terminal side. A terminal 1 and a terminal 2 have similar picture processing logic. In FIG. 8, the terminal 1 is used as an example to describe picture processing logic executed at the terminal locally. The picture processing logic executed at the terminal locally includes: obtaining pictures from a terminal side to obtain a picture set (202); extracting, from the picture set, a picture meeting a policy and parsing the picture, to obtain geographical location information related to the picture (203); obtaining a real-time target location of the terminal according to the geographical location information related to the picture (204); classifying at least one picture conforming to the real-time target location, to obtain a picture classification result (205*a*); and tagging the real-time target location onto a map page, to obtain a location tag, and obtaining a to-be-released picture according to the picture classification result and the location tag (206).

It should be noted that, picture classification may also be implemented by the server. Specifically, the terminal initiates a request to the server, to request to create a class (205b). After receiving the request, the server classifies the pictures and returns a picture classification result to the terminal (205c).

After that, the terminal reports the to-be-released picture to the server (207). Definitely, the terminal 2 may also obtain a to-be-released picture based on the foregoing terminal-executed picture processing logic and then report the to-be-released picture to the server. Interactive feedback for the released and reported picture between multiple terminals (for example, between the terminal 1 and the terminal 2) is triggered according to a first operation (208).

The embodiment of this application further includes: obtaining the geographical location information related to the picture as first geographical location information; obtaining second geographical location information according to a preset policy, the second geographical location information being used for representing a place of residence; comparing the first geographical location information with the second geographical location information; and obtaining that the real-time target location of the terminal is a travel destination if it is detected through comparison that the first geographical location information is different from the second geographical location information. Therefore, the real-time target location of the terminal is obtained according to the geographical location information related to the picture, and the real-time target location is a travel destination.

In an application scenario, in order to know whether a location where a current picture is taken is a travel destination so that a picture of a corresponding class is added to the travel map, a place of residence needs to be obtained. The place of residence includes: a registered residential place, a non-registered residential place, or the like. Specifically, a place of residence A (where the place of residence A is represented by second geographical location information) is determined first. By comparing the place of residence A with the current geographical location of the terminal, it is learned whether the user is in a travel state. First geographical location information (which is the current real-time target location of the terminal, and includes, but is not limited to, a travel destination B) is obtained according to a current GPS positioning result of the terminal or a picture positioning result (for example, a result obtained by parsing an EXIF). When the first geographical location information is different from the place of residence A, the real-time target location of the terminal is the travel destination B. For example, the place of residence is Guangdong, and the user leaves Guangdong and travels to Japan. Pictures from at least one data source are acquired, until a picture set consisting of all pictures on the terminal side is obtained. The picture set includes at least pictures taken in Guangdong and Japan. However, how to tell the current travel destination is "Japan" rather than "Guangdong"? If most pictures in the picture set are pictures taken in "Guangdong", it indicates that the place of residence is "Guangdong". If the place of residence is "Guangdong", and the current real-time target location of the terminal is not "Guangdong", the user is in a "travel state". In this case, the current real-time target location of the terminal is the travel destination, that is, "Japan".

The embodiment of this application further includes: determining the second geographical location, such as a place of residence, according to a photo geographical location. Specifically, at least one EXIF corresponding to at least one picture is obtained from the picture set; longitude and latitude information in the at least one EXIF is read, and coordinate transformation is performed on the longitude and latitude information, to obtain at least one piece of geographical location information. For at least one picture in the picture set, the quantity of pictures belonging to the same geographical location information is counted. When the quantity of pictures belonging to the same candidate geographical location information is the largest in the picture set, the second geographical location information is obtained according to the candidate geographical location.

In this embodiment, determining a place of residence according to geographical location information attached to local photos is a default manner in the system, so that the place of residence can be detected automatically.

The embodiment of this application further includes: determining the second geographical location, such as a place of residence, according to a current location of the user. Specifically, a priority policy for obtaining positioning information is read, and the priority policy is parsed, to obtain the following content:

I. Obtained Global Positioning System (GPS) geographical location information of the terminal is used as positioning information of a current location when a GPS of the terminal is in an ON state.

II. Obtained geographical location information of a base station is used as the positioning information of the current location when the GPS of the terminal is in an OFF state.

III. IP geographical location information is read when the geographical location information of the base station cannot be obtained, and the read IP geographical location information is used as the positioning information of the current location.

Then, the second geographical location information is obtained according to the positioning information of the current location.

In this embodiment, the priority policy includes: 1) a first priority: it may be detected whether the GPS of the terminal may be in an ON state, and GPS geographical location information of the terminal is obtained if the GPS is in an ON state; 2) a second priority: geographical location information of a base station is obtained if the GPS is in an OFF state; 3) a third priority: IP geographical location information is obtained if the geographical location information of the base station cannot be obtained. No matter which manner is used, after the positioning information of the location of the user is obtained, the user is prompted to select whether the current location is a place of residence. It is also possible to guide the user to set the place of residence into the system manually.

In this embodiment, the place of residence is determined by obtaining the current location of the user, and the user needs to select and set the place of residence according to a prompt.

The embodiment of this application further includes: obtaining at least one EXIF corresponding to at least one picture, reading longitude and latitude information in the at least one EXIF, and performing coordinate transformation on the longitude and latitude information to obtain geographical location information. For example, the longitude and latitude information is: the location is between 120.51 degrees to 122.12 degrees east longitude and between 30.40 degrees to 31.53 degrees north latitude, it is obtained through coordinate conversion that the geographical location information represented by the longitude and latitude information is "Shanghai". Specifically, Shanghai is located on the west coast of the Pacific Ocean, east edge of the continent, center of the south and north coast, and confluence where the Yangtze River and Huangpu River meet the ocean. The at least one picture is classified according to the geographical location information, and classification information is obtained according to pictures belonging to the same geographical location information, so that at least one picture conforming to the real-time target location is classified into a picture class determined based on the geographical location.

In this embodiment, longitude and latitude information attached to an EXIF information field of a picture is parsed, the longitude and latitude are converted into corresponding geographical location information by using an application programming interface (API) provided by a third-party map system, and pictures consistent with the geographical location information are classified to form classification information.

The embodiment of this application further includes: loading a classification model; recognizing picture content of the at least one picture by using the classification model, and obtaining, according to a recognition result, at least one picture threshold representing a content similarity in at least one dimension; comparing the at least one picture threshold with a class threshold; and obtaining classification information according to a picture greater than the class threshold if any of the at least one picture threshold is greater than the class threshold. That is, pictures greater than the class threshold is classified into a class corresponding to the class threshold, thereby classifying at least one picture conforming to the real-time target location into a picture class determined by the classification model.

In this embodiment, picture content included in one picture is not in only one dimension. For example, if a picture includes food and flowers, does the picture belong to a food class or another class? If the picture content belongs to multiple dimensions, it is necessary to calculate picture thresholds by means of picture recognition based on a classification model, and compare multiple obtained picture thresholds with a class threshold, so as to know which class the picture should be classified to according to the picture content. When the picture has only one dimension, the picture can be directly classified into the corresponding class. In this embodiment, class recognition is performed on the picture by using a machine-trained model, to form classification information.

In an example of the embodiment of this application, geographical location information of all pictures of a user is acquired, and it is determined whether a current real-time target location of the user is a place of residence or a travel destination. If the current real-time target location is a travel destination, because candidate pictures need to be added to a personal travel map and there are many candidate pictures, classification needs to be performed first. In this case, image content of photos taken at the travel destination needs to be recognized, and then pictures are classified according to a classification policy (for example, classification according to a geographical location and classification according to individuality). In one implementation, classification is performed according to a geographical location, that is, according to longitude and latitude information attached to an EXIF information field of a picture, longitude and latitude are converted into corresponding geographical location information by using an API provided by a third-party map system, and photos consistent with the geographical location information are classified to form a set. For example, classification may be performed according to Asian, Europe, and the like. In another implementation, classification is performed according to individuality, that is, class recognition is performed on pictures by using a machine-trained model, to form a set of class pictures. For example, pictures with important content such as food, scenery, and group photo may be extracted automatically. After candidate pictures are classified, the user is helped to release the class pictures taken at the travel destination (for the user, the pictures are important pictures including important content) to a personal travel map as shown in FIG. 5.

Figure 9:
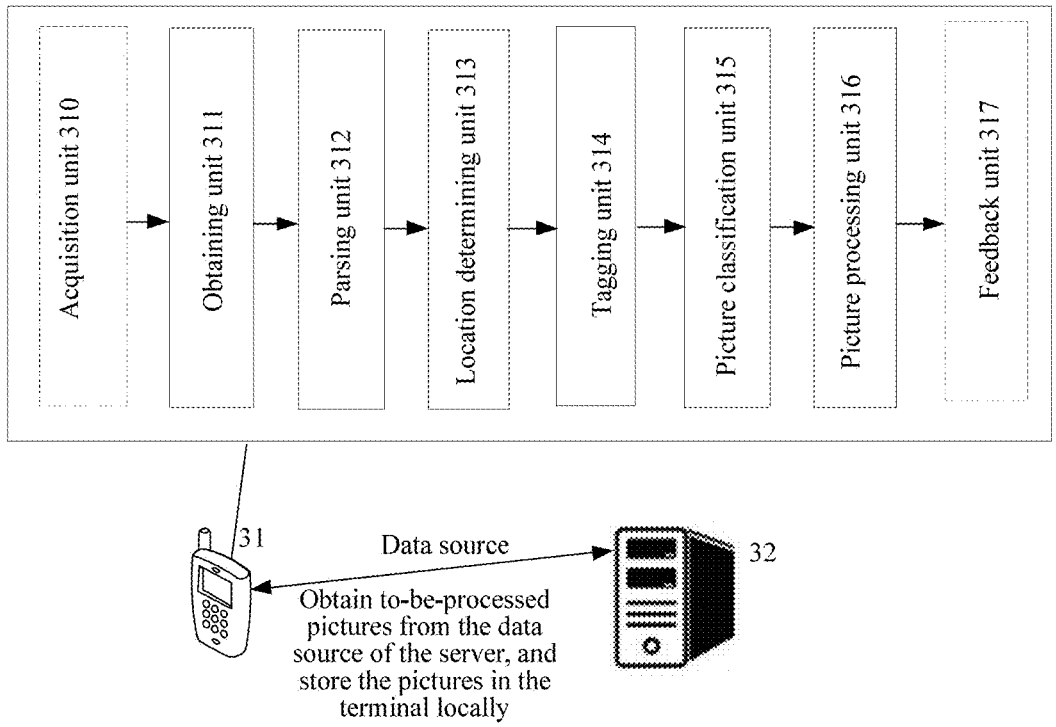
FIG. 9 is a schematic diagram of a system architecture according to an embodiment of this application.

As shown in FIG. 9, a picture releasing system according to an embodiment of this application includes: a terminal 31 and a server 32. In a scenario where processing logic is performed on the side of the terminal 31 and the server 32 is used as a part of a data source, pictures are acquired from the terminal side, until a picture set consisting of all pictures from the terminal side is obtained. There is at least one data source, which may include a data source obtained from a self-owned application according to this application (for example, Tencent album keeper) or obtained from a third-party application (Tiantian PT, Baidu Motu, Meitu, or the like), or a built-in program of the terminal (for example, a camera application of an IPHONE). Then, a picture extracted from the picture set is parsed. For example, geographical location information related to the picture is obtained according to an EXIF of the picture, for example, a picture being taken currently or a picture taken on the current day, so as to obtain a real-time target location of the terminal according to the geographical location information related to the picture. Finally, at the real-time target location, the picture is released according to classification information of the picture. The terminal 31 includes: an acquisition unit 310, configured to acquire pictures from at least one data source and store the pictures on a terminal side (the acquisition unit 311 is not mandatory). An obtaining unit 311 is configured to obtain pictures from the terminal side, to obtain a picture set. For example, pictures on the terminal side may be traversed, until a picture set consisting of all pictures from the terminal side is obtained. A parsing unit 312 is configured to extract, from the picture set, a picture meeting a policy (for example, meeting a current time policy), and parse the picture, to obtain geographical location information related to the picture. A location determining unit 313 is configured to obtain a real-time target location of the terminal according to the geographical location information related to the picture. A tagging unit 314 is configured to tag the real-time target location onto a constructed map page, to obtain a location tag. A picture classification unit 315 is configured to classify at least one picture conforming to the real-time target location, to obtain a picture classification result. A picture processing unit 316 is configured to obtain a to-be-released picture according to the picture classification result and the location tag. Then, the to-be-released picture may be releases according to the location tag. A feedback unit 317 is configured to trigger interactive feedback for the released picture according to a first operation.

In an implementation of the embodiment of this application, the location determining unit is further configured to: obtain the geographical location information related to the picture as first geographical location information; obtain second geographical location information according to a preset policy, the second geographical location information being used for representing a place of residence; compare the first geographical location information with the second geographical location information; and obtain that the real-time target location of the terminal is a travel destination if it is detected through comparison that the first geographical location information is different from the second geographical location information.

In an implementation of the embodiment of this application, the location determining unit is further configured to: obtain, from the picture set, at least one EXIF corresponding to at least one picture; read longitude and latitude information in the at least one EXIF, and perform coordinate transformation on the longitude and latitude information, to obtain at least one piece of geographical location information; count, for at least one picture in the picture set, the quantity of pictures belonging to the same geographical location information; obtain the second geographical location information according to a candidate geographical location when the quantity of pictures belonging to the candidate geographical location information is the largest in the picture set.

In an implementation of the embodiment of this application, the location determining unit is further configured to: read a priority policy for obtaining positioning information; parse the priority policy; use obtained GPS geographical location information of the terminal as positioning information of a current location when a GPS of the terminal is in an ON state; use obtained geographical location information of a base station as the positioning information of the current location when the GPS of the terminal is in an OFF state; read IP geographical location information when the geographical location information of the base station cannot be obtained, and use the read IP geographical location information as the positioning information of the current location; and obtain the second geographical location information according to the positioning information of the current location.

In an implementation of the embodiment of this application, the picture releasing unit is further configured to: obtain at least one EXIF corresponding to at least one picture; read longitude and latitude information in the at least one EXIF, and perform coordinate transformation on the longitude and latitude information, to obtain geographical location information; classify the at least one picture according to the geographical location information; and obtain classification information according to pictures belonging to the same geographical location information.

In an implementation of the embodiment of this application, the picture releasing unit is further configured to: load a classification model; recognize picture content of the at least one picture by using the classification model, and obtain, according to a recognition result, at least one picture threshold representing a content similarity in at least one dimension; compare the at least one picture threshold with a class threshold; and obtain classification information according to a picture greater than the class threshold if any of the at least one picture threshold is greater than the class threshold.

It should be noted that, the foregoing description related to the terminal and the server is similar to the description of the foregoing method, and has the same beneficial effect as the method. Details are not described herein again. For technical details not disclosed in the embodiments of the terminal and the server in this application, refer to the content described in the embodiment according to the method process of this application.

The embodiment of this application is illustrated as follows by using a practical application scenario as an example.

Figure 10:
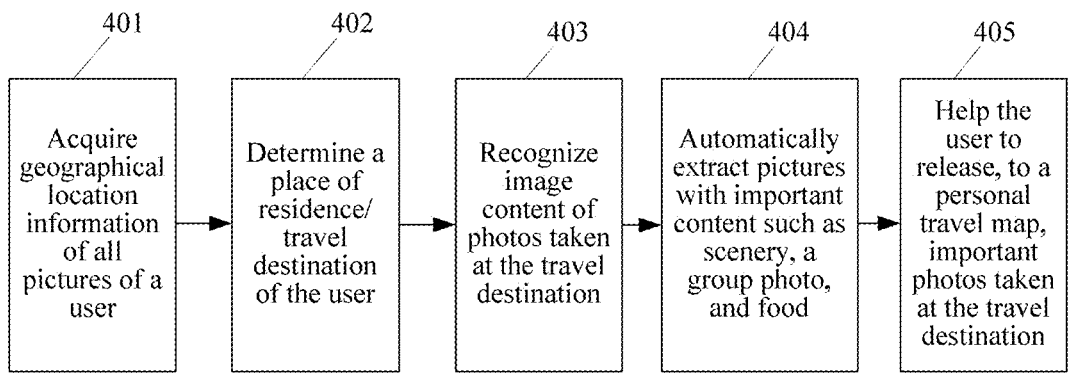
FIG. 10 is a flowchart of a picture releasing scenario according to an embodiment of this application.

In an application scenario according to an embodiment of this application, a place of residence/travel destination of a user can be calculated automatically according to EXIF positioning information in an existing picture of the user; based on a location of the picture, the user is helped to establish an exclusive travel map with a social attribute. On processing procedure is as shown in FIG. 10, and includes the following steps:

Step 401: Acquire geographical location information of a picture where a user is located.

Step 402: Determine a place of residence/travel destination of the user.

Step 403: Recognize image content of photos taken at the travel destination.

Step 404: Automatically extract pictures with important content such as scenery, a group photo, and food.

Step 405: Help the user to release, to a personal travel map, important photos taken at the travel destination.

Figure 11:
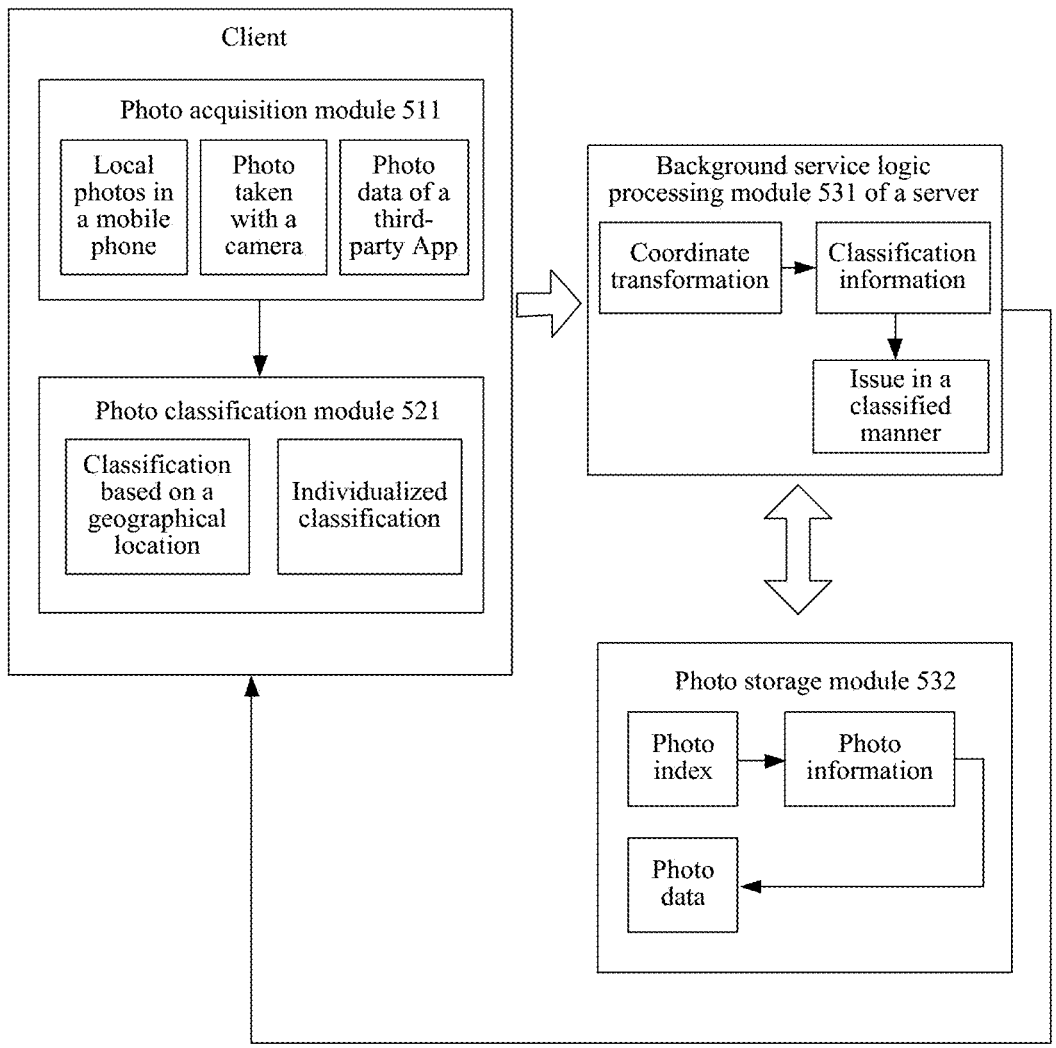
FIG. 11 is an overall frame diagram of a picture releasing system according to an embodiment of this application.

FIG. 11 is an overall block diagram of a picture releasing system according to an embodiment of this application. The system at least includes: a photo acquisition module 511, a photo classification module 521, a background service logic processing module 531, and a photo storage module 532. The photo acquisition module 511 and the photo classification module 521 may be located on a terminal side, and are specifically run in an album management application on the terminal side. The background service logic processing module 531 is located on a server side, and the photo storage module 532 may be located on the server side or the terminal side. When located on the server side, the photo storage module 532 may perform storage management on photos uploaded by all users, and when located on the terminal side, the photo storage module 532 only performs storage management on photos of a local user.

The photo acquisition module 511 is configured to obtain photos through multiple approaches, for example, query local photos of a mobile phone terminal, take a photo through a camera of a mobile phone terminal, or query photo data through a third-party APP.

The photo classification module 521 is configured to classify pictures by means of geographical location classification and individualized classification.

The background service logic processing module 531 is configured to parse an uploaded picture to obtain longitude and latitude information, and then perform coordinate transformation on the longitude and latitude information to obtain geographical location information. By using this service logic, pictures may also be classified by means of geographical location classification and individualized classification, to obtain classification information. When the server can obtain the classification information, processing pressure of the terminal side is alleviated, and the classification information can be directly issued to the terminal side for use.

The photo storage module 532 is configured to manage stored photos. By associating a photo index with photo information, multiple pieces of photo information are combined into photo data. When located on the server side, the photo data may be queried by different terminals. When located on the terminal side, the photo data can only be queried by the local user.

Operations that can be performed by both terminal and the server include: classification of geographical locations, individualized classification (food, scenery, group photo, and the like), and determining of a place of residence (including a registered residential place and a non-registered residential place). On the terminal side, the operations may be performed by the photo classification module; on the server side, the operations may be performed by the background service logic processing module. The operations are specifically described as follows:

In the classification of geographical locations, according to longitude and latitude information attached to an EXIF information field of a photo, the longitude and latitude are converted into corresponding geographical location information by using an API provided by a third-party map system, and photos consistent with the geographical location information are classified into a set. In individualized classification, class recognition is performed on the picture by using a machine-trained model, to form a set.

Figure 12:
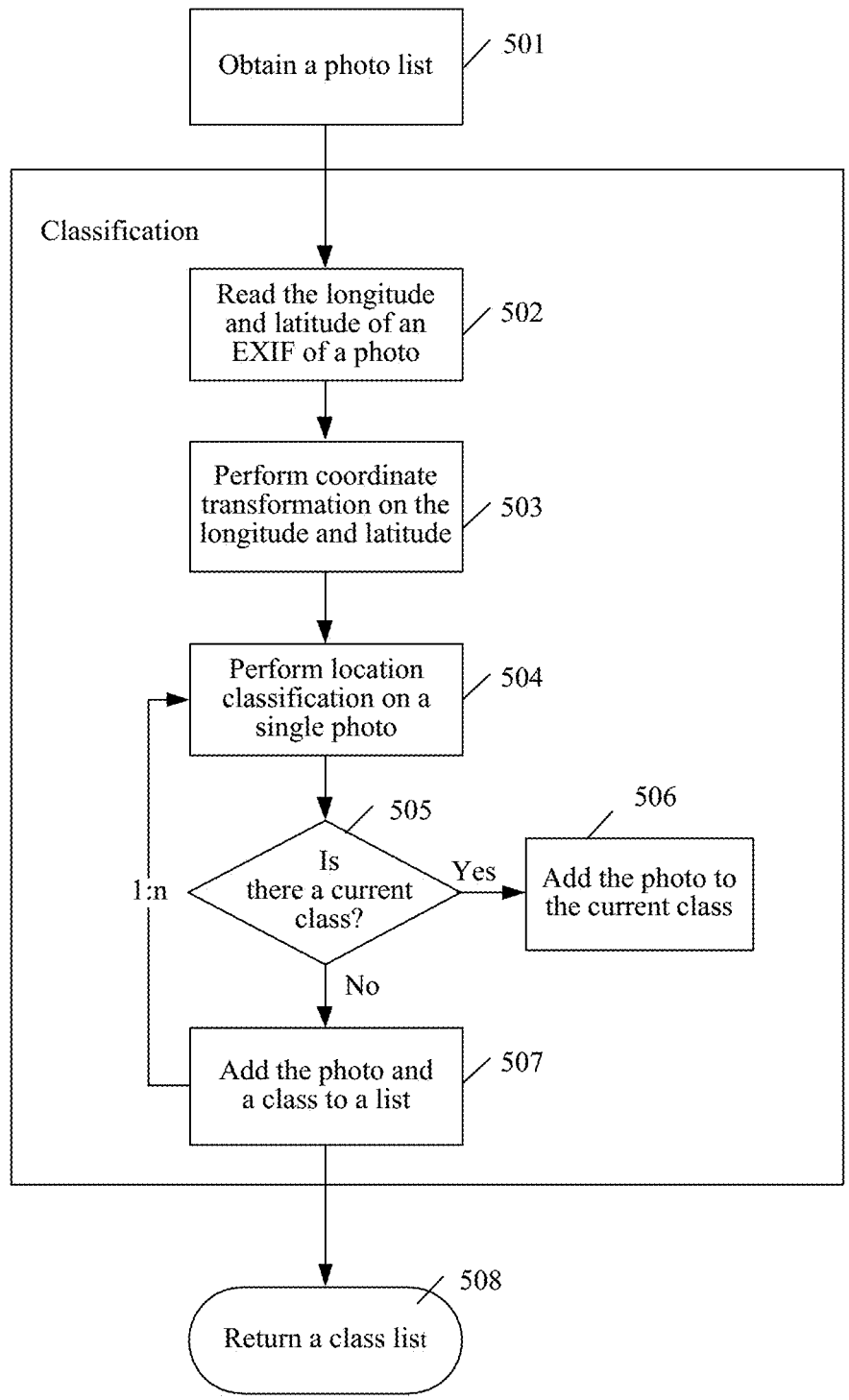
FIG. 12 is a flowchart based on a geographical location classification scenario according to an embodiment of this application.

FIG. 12 is a flowchart based on geographical location classification, including the following steps:

Step 501: Obtain a photo list.

Step 502: Read the longitude and latitude of an EXIF of a photo.

Step 503: Perform coordinate transformation on the longitude and latitude.

Step 504: Perform location classification on a single photo.

Step 505: Determine whether there is a current class; if yes, perform step 506; otherwise, perform step 507.

Step 506: Add the photo to the current class.

Step 507: Add the photo and a class to a list.

Step 508: Return a class list.

It should be noted that, after step 507 is performed, process may be return to step 504 to continue to perform location classification on a single photo, or step 508 may be performed to return a class list of the single photo. Alternatively, step 508 may be performed after all photos are classified according to locations, and class lists of all the photos are returned together.

Figure 13:
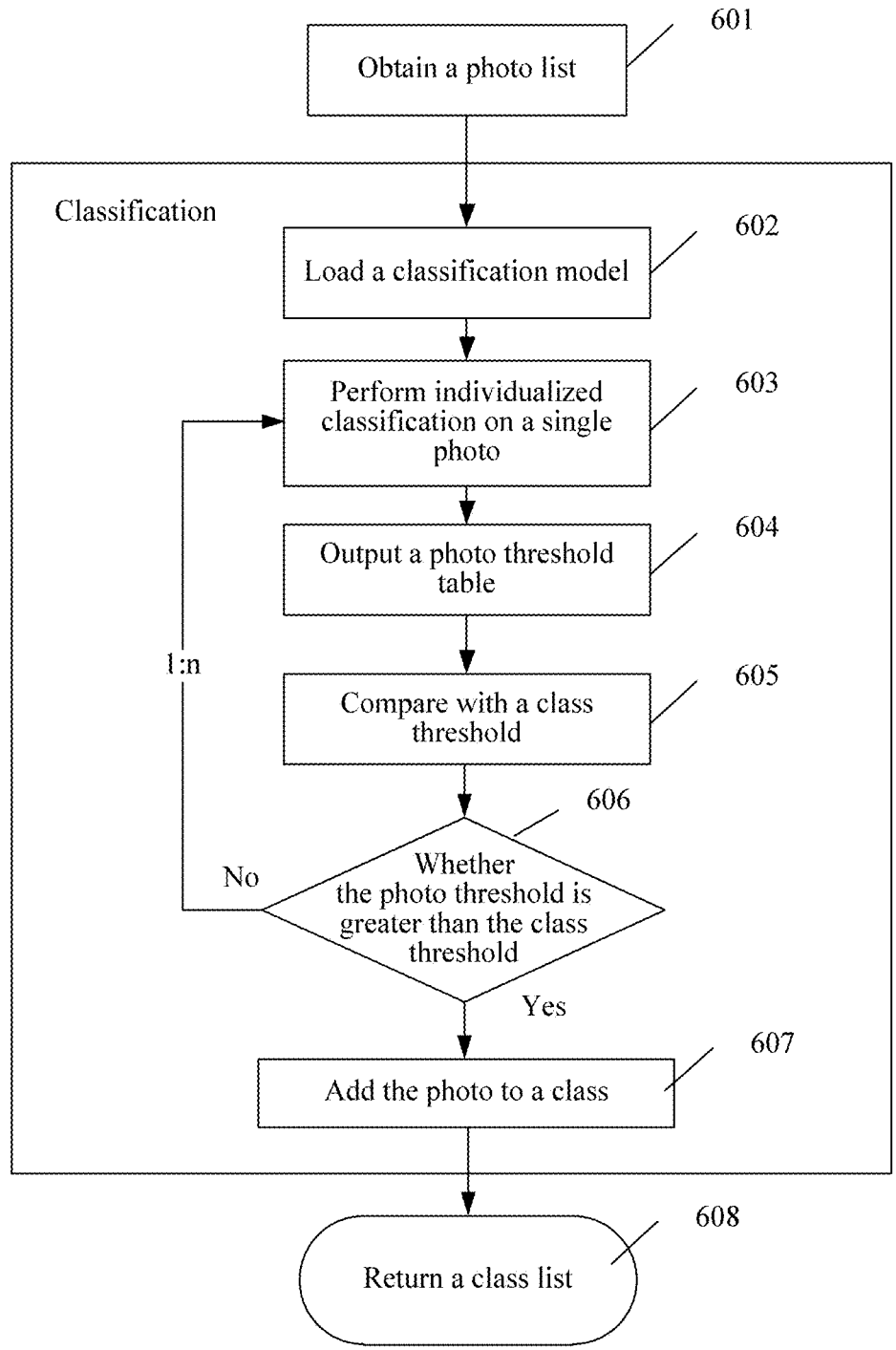
FIG. 13 is a flowchart based on an individualized classification scenario according to an embodiment of this application.

FIG. 13 is a flowchart based on individualized classification, including the following steps:

Step 601: Obtain a photo list.

Step 602: Load a classification model.

Step 603: Perform individualized classification on a single photo.

Step 604: Output a photo threshold table.

Step 605: Perform comparison on a photo threshold.

Step 606: Determine whether the photo threshold is greater than a class threshold; if yes, perform step 607; otherwise, perform step 603.

Step 607: Add the photo to a current class.

Step 608: Return a class list.

Figure 14:
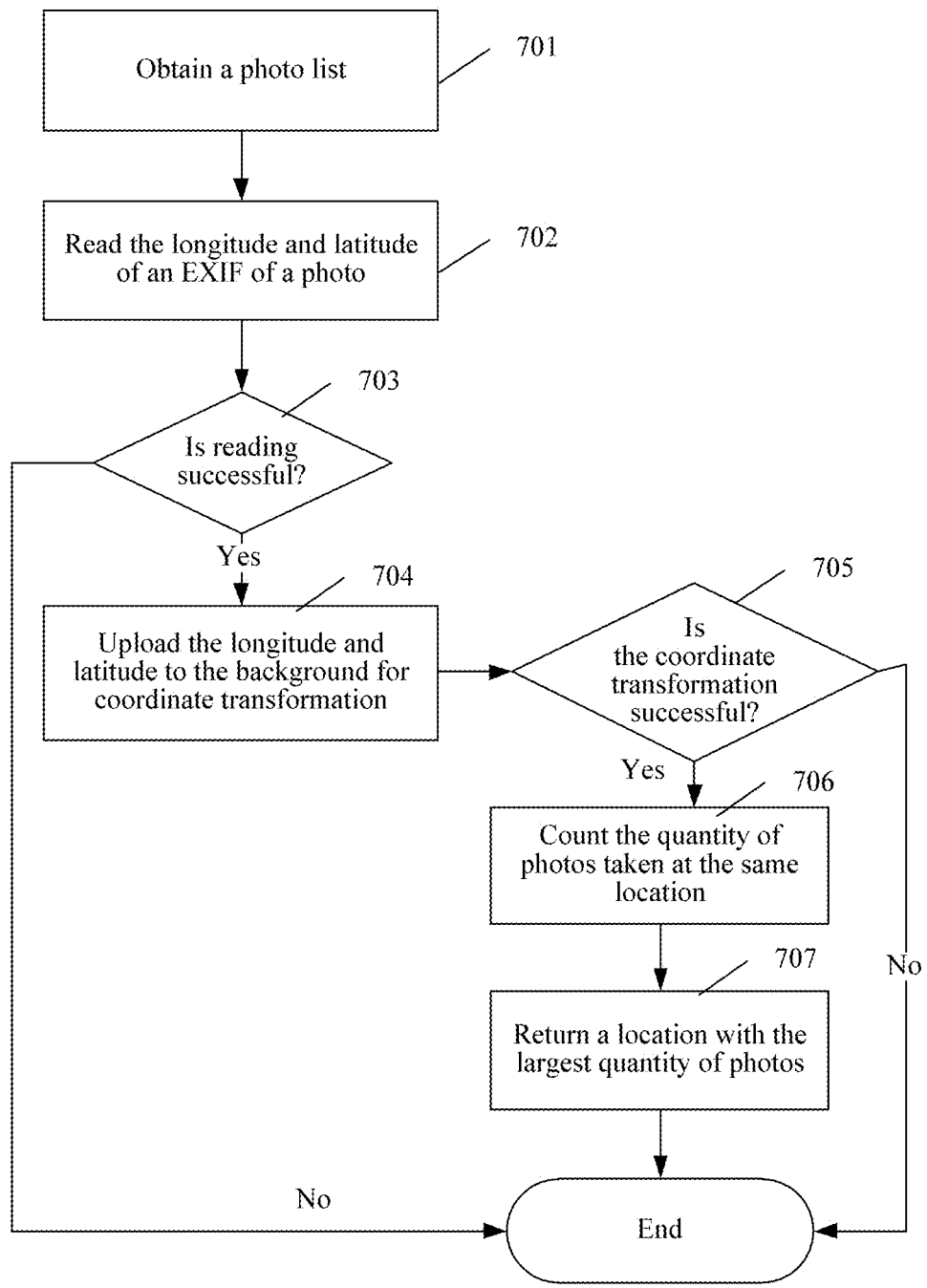
FIG. 14 is a flowchart of a scenario of determining based on a geographical location of a photo according to an embodiment of this application.

FIG. 14 is a flowchart of determining a geographical location of a photo, including the following steps:

Step 701: Obtain a photo list.

Step 702: Read the longitude and latitude of an EXIF of a photo.

Step 703: Determine whether reading is successful; if yes, perform step 704; otherwise, end the current process.

Step 704: Upload the longitude and latitude to the background for coordinate transformation.

Step 705: Determine whether the coordinate transformation is successful; if yes, perform step 706; otherwise, end the current process.

Step 706: Count the quantity of photos taken at the same location.

Step 707: Obtain a location from which the largest photo quantity is returned, where the location is a place of residence.

Figure 15:
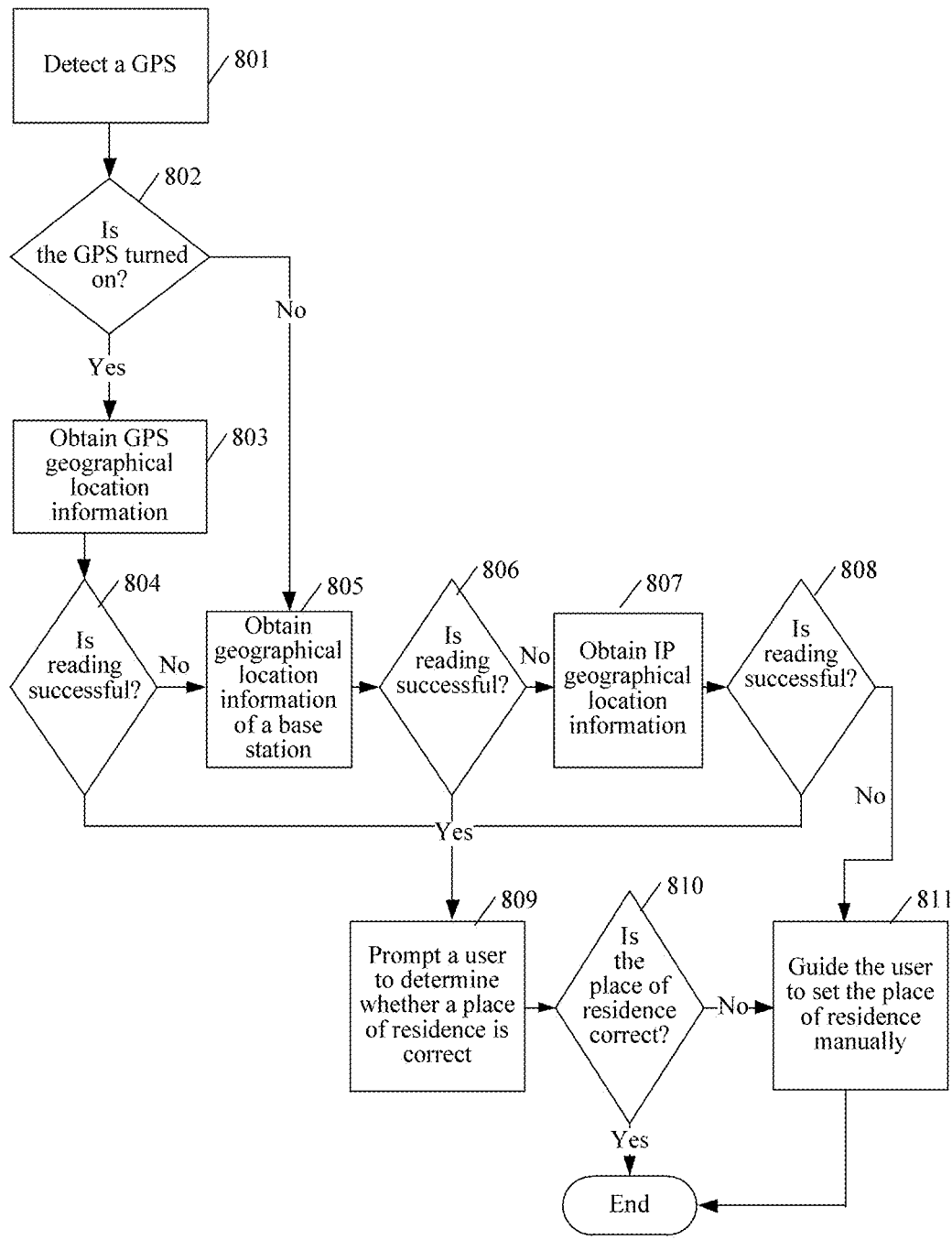
FIG. 15 is a flowchart of a scenario of determining based on a current location of a user according to an embodiment of this application.

FIG. 15 is a flowchart of determining based on a current location of a user, including the following steps:

Steps 801-802: Detect whether a GPS of a terminal is turned on; if yes, perform step 803; otherwise, perform step 805.

Step 803: Obtain GPS geographical location information.

Step 804: Determine whether reading is successful; if yes, perform step 809; otherwise, perform step 805.

Step 805: Obtain geographical location information of a base station.

Step 806: Determine whether reading is successful; if yes, perform step 809; otherwise, perform step 807.

Step 807: Obtain IP geographical location information.

Step 808: Determine whether reading is successful; if yes, perform step 809; otherwise, perform step 811.

Step 809: Prompt a user to determine whether a place of residence is correct.

Step 810: Determine whether the place of residence is correct; if yes, end the current process; otherwise, perform step 811.

Step 811: Guide the user to set the place of residence manually.

In addition to the foregoing modules, the picture releasing system according to the embodiment of this application may further include: a picture releasing module, a social module, and a classified photo presentation module, which are separately described as follows:

The picture releasing module is configured to backup classified photos to a background server, so that other uses can browse the photos. The user may upload high-quality photos or original photos.

Figure 16:
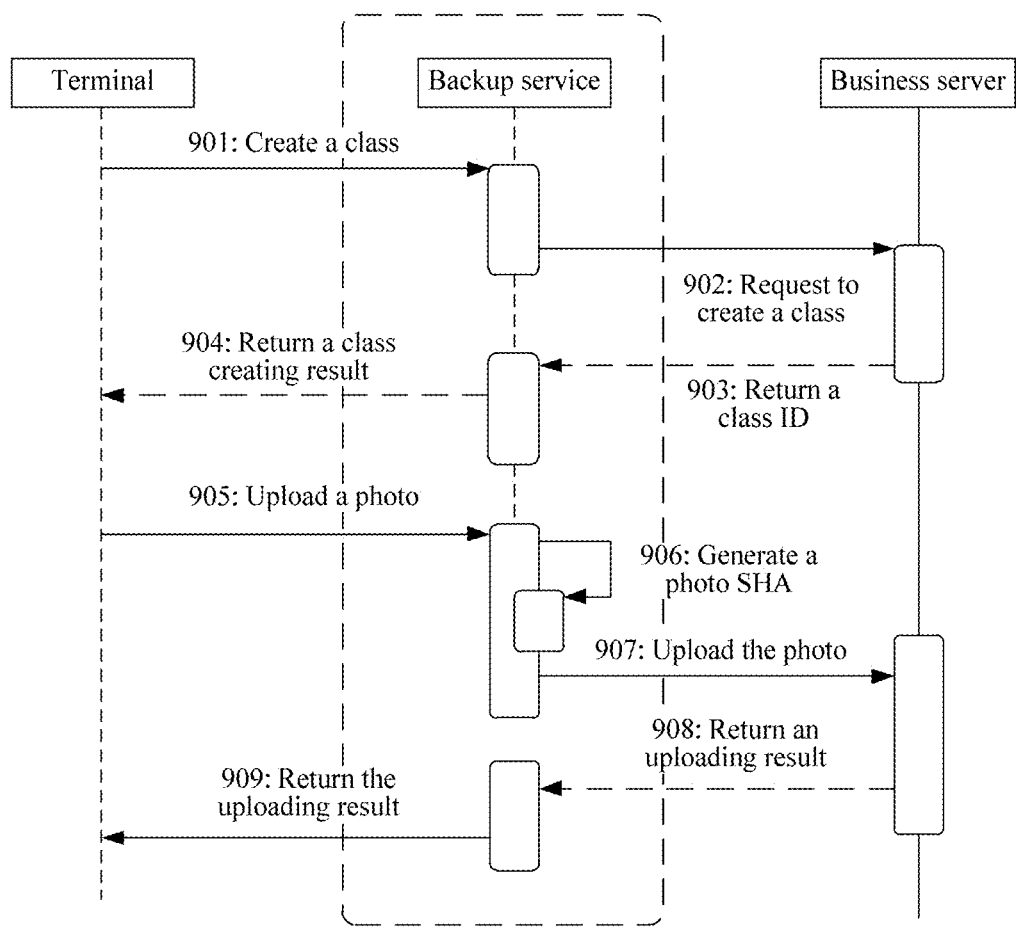
FIG. 16 is a sequence diagram of a photo releasing scenario according to an embodiment of this application.

FIG. 16 is a time sequence of photo releasing, including the following steps:

Step 901: Create a class.

Step 902: Request to create a class.

Step 903: Return a class ID.

Step 904: Return a class creating result.

Step 905: Upload a photo.

Step 906: Generate a photo SHA.

Step 907: Upload the photo.

Step 908: Return an uploading result.

Step 909: Return the uploading result.

The social module mainly includes functions of presenting photos in a classified manner, giving a like, and making a comment.

The classified photo presentation module is configured to display, according to the geographical location information, a set of classified photos at a location where the corresponding class is displayed by using an API of a third-party map.

An embodiment of this application further provides a computer storage medium, for example, a memory including a computer program. The computer program may be executed by a processor of a data processing apparatus to complete the steps of the foregoing method. The computer storage medium may be an FRAM, a ROM, a PROM, an EPROM, an EEPROM, a flash memory, a magnetic surface memory, an optical disc, a CD-ROM, or other memories, or may be various devices including one of or any combination of the foregoing memories, for example, a mobile phone, a computer, a tablet device, and a personal digital assistant.

Figure 17:
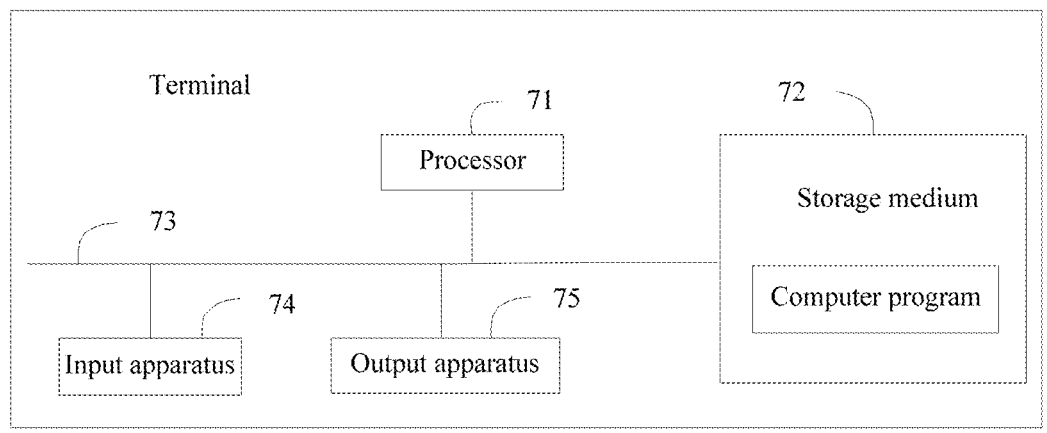
FIG. 17 is a schematic diagram of a hardware structure of a terminal according to an embodiment of this application.

The computer readable storage medium provided by the embodiment of this application stores a computer program, and when the computer program is run by a processor, steps of the following picture file management method are performed:

As shown in FIG. 17, in addition to a processor 71 and a storage medium 72 (which may be implemented by a memory), a terminal side may further include a general serial bus 73, an input apparatus 74, and an output apparatus 75. The storage medium includes a computer program, and when the computer program is run by the processor on the terminal side, the following steps may be performed:

acquiring pictures from at least one data source, until a picture set consisting of all acquired pictures is obtained;

extracting, from the picture set, a picture meeting a current time policy and parsing the picture, to obtain geographical location information related to the picture;

obtaining a real-time target location of a terminal according to the geographical location information related to the picture;

tagging the real-time target location onto a constructed map page, to obtain a location tag;

classifying at least one picture conforming to the real-time target location, and releasing the at picture according to the location tag.

When the computer program is run by the processor on the terminal side, the following steps are further performed:

obtaining the geographical location information related to the picture as first geographical location information;

obtaining second geographical location information according to a preset policy, the second geographical location information being used for representing a place of residence;

comparing the first geographical location information with the second geographical location information; and obtaining that the real-time target location of the terminal is a travel destination if it is detected through comparison that the first geographical location information is different from the second geographical location information.

When the computer program is run by the processor on the terminal side, the following steps are further performed:

obtaining, from the picture set, at least one EXIF corresponding to at least one picture;

reading longitude and latitude information in the at least one EXIF, and performing coordinate transformation on the longitude and latitude information, to obtain at least one piece of geographical location information;

counting, for at least one picture in the picture set, the quantity of pictures belonging to the same geographical location information;

obtaining the second geographical location information according to a candidate geographical location when the quantity of pictures belonging to the candidate geographical location information is the largest in the picture set.

When the computer program is run by the processor on the terminal side, the following steps are further performed:

reading a priority policy for obtaining positioning information; parsing the priority policy;

using obtained GPS geographical location information of the terminal as positioning information of a current location when a GPS of the terminal is in an ON state;

using obtained geographical location information of a base station as the positioning information of the current location when the GPS of the terminal is in an OFF state;

reading IP geographical location information when the geographical location information of the base station cannot be obtained, and using the read IP geographical location information as the positioning information of the current location; and obtaining the second geographical location information according to the positioning information of the current location.

When the computer program is run by the processor on the terminal side, the following steps are further performed:

obtaining at least one EXIF corresponding to at least one picture;

reading longitude and latitude information in the at least one EXIF, and performing coordinate transformation on the longitude and latitude information, to obtain geographical location information;

classifying the at least one picture according to the geographical location information; and obtaining classification information according to pictures belonging to the same geographical location information.

When the computer program is run by the processor on the terminal side, the following steps are further performed:

loading a classification model;

recognizing picture content of the at least one picture by using the classification model, and obtaining, according to a recognition result, at least one picture threshold representing a content similarity in at least one dimension;

comparing the at least one picture threshold with a class threshold; and obtaining classification information according to a picture greater than the class threshold if any of the at least one picture threshold is greater than the class threshold.

Figure 18:
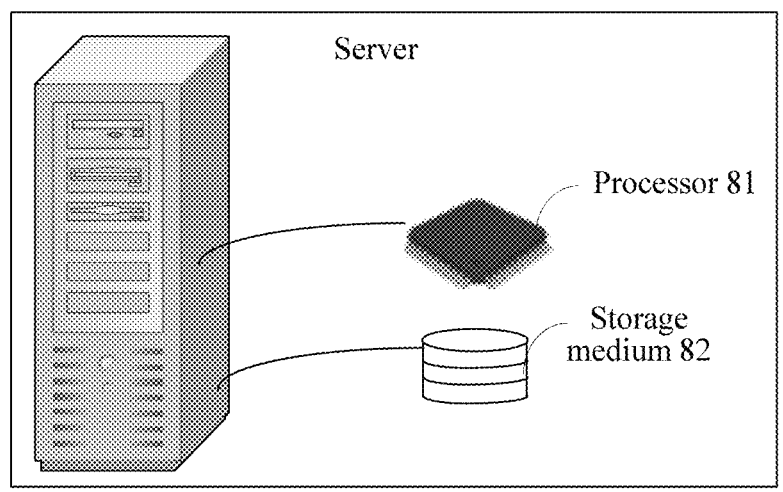
FIG. 18 is a schematic diagram of a hardware structure of a server according to an embodiment of this application.

As shown in FIG. 18, a server side at least includes a processor 81 and a storage medium 82 (which may be implemented by a memory). The storage medium includes a computer program, and when the computer program is run by the processor on the server side, the following steps are performed:

obtaining a picture set from a terminal, the picture set including pictures acquired by the terminal from at least one data source, and the picture set being obtained after all pictures on a terminal side are acquired;

extracting, from the picture set, a picture meeting a current time policy and parsing the picture, to obtain geographical location information related to the picture;

obtaining a real-time target location of the terminal according to the geographical location information related to the picture;

classifying at least one picture conforming to the real-time target location, to obtain classification information; and issuing the real-time target location and the classification information to the terminal, so that the terminal tags the real-time target location onto a constructed map page, to obtain a location tag, and releases the picture on the location tag according to the classification information.

When the computer program is run by the processor on the server side, the following steps are further performed:

issuing the classification information to a picture storage database, and identifying at least one piece of picture information in the picture storage database according to a picture index.

When the computer program is run by the processor on the server side, the following steps are further performed:

obtaining the geographical location information related to the picture as first geographical location information;

obtaining second geographical location information according to a preset policy, the second geographical location information being used for representing a place of residence;

comparing the first geographical location information with the second geographical location information; and obtaining that the real-time target location of the terminal is a travel destination if it is detected through comparison that the first geographical location information is different from the second geographical location information.

When the computer program is run by the processor on the server side, the following steps are further performed:

obtaining, from the picture set, at least one EXIF corresponding to at least one picture;

reading longitude and latitude information in the at least one EXIF, and performing coordinate transformation on the longitude and latitude information, to obtain at least one piece of geographical location information;

counting, for at least one picture in the picture set, the quantity of pictures belonging to the same geographical location information;

obtaining the second geographical location information according to a candidate geographical location when the quantity of pictures belonging to the candidate geographical location information is the largest in the picture set.

When the computer program is run by the processor on the server side, the following steps are further performed:

reading a priority policy for obtaining positioning information; parsing the priority policy;

using obtained GPS geographical location information of the terminal as positioning information of a current location when a GPS of the terminal is in an ON state;

using obtained geographical location information of a base station as the positioning information of the current location when the GPS of the terminal is in an OFF state;

reading IP geographical location information when the geographical location information of the base station cannot be obtained, and using the read IP geographical location information as the positioning information of the current location; and obtaining the second geographical location information according to the positioning information of the current location.

When the computer program is run by the processor on the server side, the following steps are further performed:

obtaining at least one EXIF corresponding to at least one picture;

reading longitude and latitude information in the at least one EXIF, and performing coordinate transformation on the longitude and latitude information, to obtain geographical location information;

classifying the at least one picture according to the geographical location information; and obtaining classification information according to pictures belonging to the same geographical location information.

When the computer program is run by the processor on the server side, the following steps are further performed:

loading a classification model;

recognizing picture content of the at least one picture by using the classification model, and obtaining, according to a recognition result, at least one picture threshold representing a content similarity in at least one dimension;

comparing the at least one picture threshold with a class threshold; and obtaining classification information according to a picture greater than the class threshold if any of the at least one picture threshold is greater than the class threshold.

In the several embodiments provided in this application, it should be understood that the disclosed device and method may be implemented in other manners. For example, the described apparatus embodiments are merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the devices or units may be implemented in electronic, mechanical, or other forms.

The units described as separate parts may or may not be physically separate, and the parts displayed as units may or may not be physical units, may be located in one position, or may be distributed on a plurality of network units. Some of or all of the units may be selected according to actual needs to achieve the objectives of the solutions of the embodiments.

In addition, functional units in the embodiments of this application may be integrated into one processing unit, or each of the units may exist alone physically, or two or more units may be integrated into one unit. The integrated unit may be implemented in a hardware form or in a form of hardware plus software functional units.

A person of ordinary skill in the art may understand that all or some of the steps of the foregoing embodiments may be implemented by a program instructing relevant hardware. The program may be stored in a computer readable storage medium. When the program is executed, steps including the foregoing method embodiments are performed. The storage medium may include: various media capable of storing program code, such as a mobile storage device, a read-only memory (ROM), a random access memory (RAM), a magnetic disk, or an optical disc.

Alternatively, when the integrated unit in this application is implemented in a form of a software functional unit and sold or used as an independent product, the integrated unit may be stored in a computer readable storage medium. Based on such an understanding, the technical solutions of the embodiments of this application essentially, or the part contributing to the prior art may be implemented in a form of a software product. The computer software product is stored in a storage medium and includes several instructions for instructing a computer device (which may be a personal computer, a server, a network device, or the like) to perform all or some of the steps of the methods described in the embodiments of this application. The foregoing storage medium includes: various media capable of storing program code, such as a mobile storage device, a ROM, a RAM, a magnetic disk, or an optical disc.

The foregoing descriptions are merely specific embodiments of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the appended claims.

INDUSTRIAL APPLICABILITY

By using the embodiments of this application, pictures on a terminal side are obtained and a picture meeting a policy is extracted; the picture is parsed to obtain geographical location information related to the picture, and a real-time target location of a terminal is obtained according to the geographical location information related to the picture. Therefore, it is unnecessary to manually select and add a geographical location, and the geographical location obtained through picture acquisition and automatic detection can reflect a real-time geographical location of the picture taken, and conforms to the location where the picture is taken, thereby meeting a real-time requirement of information sharing based on a social networking platform. The real-time target location is tagged on a constructed map page, to obtain a location tag. After at least one picture conforming to the real-time target location is classified, the picture is released according to the location tag. This is real-time picture information releasing. Because a picture can be released in real time at a real-time geographical location based on classification, the picture is released more accurately and in time. Therefore, users can perform interactive feedback for the picture information in time, thereby improving interactivity of information sharing.

What is claimed is:

1. A picture file management method performed at a computing device having one or more processors and memory storing programs to be executed by the one or more processors, the method comprising:
   obtaining a picture set;
   extracting, from the picture set, a picture meeting a policy and parsing the picture, to obtain geographical location information related to the picture;
   obtaining a real-time target location of a terminal according to the geographical location information related to the picture;
   tagging the real-time target location onto a map page, to generate a location tag for the picture;
   classifying at least one picture conforming to the real-time target location, to obtain a picture classification result; and
   obtaining a to-be-released picture according to the picture classification result and the location tag.

2. The method according to claim 1, further comprising:
   releasing the picture on a user account of a social networking platform according to the picture classification result and the location tag.

3. The method according to claim 1, wherein the obtaining a real-time target location of a terminal according to the geographical location information related to the picture comprises:
   obtaining the geographical location information related to the picture as first geographical location information;
   obtaining second geographical location information according to a preset policy, the second geographical location information being used for representing a place of residence;
   comparing the first geographical location information with the second geographical location information; and
   obtaining that the real-time target location of the terminal is a travel destination if it is detected through comparison that the first geographical location information is different from the second geographical location information.

4. The method according to claim 3, wherein the obtaining second geographical location information according to a preset policy comprises:
   obtaining, from the picture set, at least one exchangeable image file (EXIF) corresponding to at least one picture;
   reading longitude and latitude information in the at least one EXIF, and performing coordinate transformation on the longitude and latitude information, to obtain at least one piece of geographical location information;
   counting, for at least one picture in the picture set, the quantity of pictures belonging to the same geographical location information;
   obtaining the second geographical location information according to a candidate geographical location when the quantity of pictures belonging to the candidate geographical location information is the largest in the picture set.

5. The method according to claim 3, wherein the obtaining second geographical location information according to a preset policy comprises:
   reading a priority policy for obtaining positioning information;
   parsing the priority policy;
   using obtained Global Positioning System (GPS) geographical location information of the terminal as positioning information of a current location when a GPS of the terminal is in an ON state;
   using obtained geographical location information of a base station as the positioning information of the current location when the GPS of the terminal is in an OFF state;
   reading IP geographical location information when the geographical location information of the base station cannot be obtained, and using the read IP geographical location information as the positioning information of the current location; and
   obtaining the second geographical location information according to the positioning information of the current location.

6. The method according to claim 1, wherein the classifying at least one picture conforming to the real-time target location comprises:
   obtaining at least one EXIF corresponding to at least one picture;
   reading longitude and latitude information in the at least one EXIF, and performing coordinate transformation on the longitude and latitude information, to obtain geographical location information;
   classifying the at least one picture according to the geographical location information; and
   obtaining classification information according to pictures belonging to the same geographical location information.

7. The method according to claim 1, wherein the classifying at least one picture conforming to the real-time target location comprises:
   loading a classification model;
   recognizing picture content of the at least one picture by using the classification model, and obtaining, according to a recognition result, at least one picture threshold representing a content similarity in at least one dimension;
   comparing the at least one picture threshold with a class threshold; and
   obtaining classification information according to a picture greater than the class threshold if any of the at least one picture threshold is greater than the class threshold.

8. A computing device comprising one or more processors, memory coupled to the one or more processors and a plurality of programs stored in the memory that, when executed by the one or more processors, cause the computing device to perform a plurality of operations comprising:

obtaining a picture set;
extracting, from the picture set, a picture meeting a policy and parsing the picture, to obtain geographical location information related to the picture;
obtaining a real-time target location of a terminal according to the geographical location information related to the picture;
tagging the real-time target location onto a map page, to generate a location tag for the picture;
classifying at least one picture conforming to the real-time target location, to obtain a picture classification result; and
obtaining a to-be-released picture according to the picture classification result and the location tag.

9. The computing device according to claim 8, wherein the plurality of operations further comprise:
releasing the picture on a user account of a social networking platform according to the picture classification result and the location tag.

10. The computing device according to claim 8, wherein the obtaining a real-time target location of a terminal according to the geographical location information related to the picture comprises:
obtaining the geographical location information related to the picture as first geographical location information;
obtaining second geographical location information according to a preset policy, the second geographical location information being used for representing a place of residence;
comparing the first geographical location information with the second geographical location information; and
obtaining that the real-time target location of the terminal is a travel destination if it is detected through comparison that the first geographical location information is different from the second geographical location information.

11. The computing device according to claim 10, wherein the obtaining second geographical location information according to a preset policy comprises:
obtaining, from the picture set, at least one exchangeable image file (EXIF) corresponding to at least one picture;
reading longitude and latitude information in the at least one EXIF, and performing coordinate transformation on the longitude and latitude information, to obtain at least one piece of geographical location information;
counting, for at least one picture in the picture set, the quantity of pictures belonging to the same geographical location information;
obtaining the second geographical location information according to a candidate geographical location when the quantity of pictures belonging to the candidate geographical location information is the largest in the picture set.

12. The computing device according to claim 10, wherein the obtaining second geographical location information according to a preset policy comprises:
reading a priority policy for obtaining positioning information;
parsing the priority policy;
using obtained Global Positioning System (GPS) geographical location information of the terminal as positioning information of a current location when a GPS of the terminal is in an ON state;
using obtained geographical location information of a base station as the positioning information of the current location when the GPS of the terminal is in an OFF state;
reading IP geographical location information when the geographical location information of the base station cannot be obtained, and using the read IP geographical location information as the positioning information of the current location; and
obtaining the second geographical location information according to the positioning information of the current location.

13. The computing device according to claim 8, wherein the classifying at least one picture conforming to the real-time target location comprises:
obtaining at least one EXIF corresponding to at least one picture;
reading longitude and latitude information in the at least one EXIF, and performing coordinate transformation on the longitude and latitude information, to obtain geographical location information;
classifying the at least one picture according to the geographical location information; and
obtaining classification information according to pictures belonging to the same geographical location information.

14. The computing device according to claim 8, wherein the classifying at least one picture conforming to the real-time target location comprises:
loading a classification model;
recognizing picture content of the at least one picture by using the classification model, and obtaining, according to a recognition result, at least one picture threshold representing a content similarity in at least one dimension;
comparing the at least one picture threshold with a class threshold; and
obtaining classification information according to a picture greater than the class threshold if any of the at least one picture threshold is greater than the class threshold.

15. A non-transitory computer readable storage medium storing a plurality of machine readable instructions in connection with a computing device having one or more processors, wherein the plurality of machine readable instructions, when executed by the one or more processors, cause the computing device to perform a plurality of operations including:
obtaining a picture set;
extracting, from the picture set, a picture meeting a policy and parsing the picture, to obtain geographical location information related to the picture;
obtaining a real-time target location of a terminal according to the geographical location information related to the picture;
tagging the real-time target location onto a map page, to generate a location tag for the picture;
classifying at least one picture conforming to the real-time target location, to obtain a picture classification result; and
obtaining a to-be-released picture according to the picture classification result and the location tag.

16. The non-transitory computer readable storage medium according to claim 15, wherein the obtaining a real-time target location of a terminal according to the geographical location information related to the picture comprises:
obtaining the geographical location information related to the picture as first geographical location information;
obtaining second geographical location information according to a preset policy, the second geographical location information being used for representing a place of residence;

comparing the first geographical location information with the second geographical location information; and obtaining that the real-time target location of the terminal is a travel destination if it is detected through comparison that the first geographical location information is different from the second geographical location information.

17. The non-transitory computer readable storage medium according to claim 16, wherein the obtaining second geographical location information according to a preset policy comprises:

obtaining, from the picture set, at least one exchangeable image file (EXIF) corresponding to at least one picture;

reading longitude and latitude information in the at least one EXIF, and performing coordinate transformation on the longitude and latitude information, to obtain at least one piece of geographical location information;

counting, for at least one picture in the picture set, the quantity of pictures belonging to the same geographical location information;

obtaining the second geographical location information according to a candidate geographical location when the quantity of pictures belonging to the candidate geographical location information is the largest in the picture set.

18. The non-transitory computer readable storage medium according to claim 16, wherein the obtaining second geographical location information according to a preset policy comprises:

reading a priority policy for obtaining positioning information;

parsing the priority policy;

using obtained Global Positioning System (GPS) geographical location information of the terminal as positioning information of a current location when a GPS of the terminal is in an ON state;

using obtained geographical location information of a base station as the positioning information of the current location when the GPS of the terminal is in an OFF state;

reading IP geographical location information when the geographical location information of the base station cannot be obtained, and using the read IP geographical location information as the positioning information of the current location; and obtaining the second geographical location information according to the positioning information of the current location.

19. The non-transitory computer readable storage medium according to claim 15, wherein the classifying at least one picture conforming to the real-time target location comprises:

obtaining at least one EXIF corresponding to at least one picture;

reading longitude and latitude information in the at least one EXIF, and performing coordinate transformation on the longitude and latitude information, to obtain geographical location information;

classifying the at least one picture according to the geographical location information; and obtaining classification information according to pictures belonging to the same geographical location information.

20. The non-transitory computer readable storage medium according to claim 15, wherein the classifying at least one picture conforming to the real-time target location comprises:

loading a classification model;

recognizing picture content of the at least one picture by using the classification model, and obtaining, according to a recognition result, at least one picture threshold representing a content similarity in at least one dimension;

comparing the at least one picture threshold with a class threshold; and obtaining classification information according to a picture greater than the class threshold if any of the at least one picture threshold is greater than the class threshold.

* * * * *